United States Patent [19]

Milkovich et al.

[11] 3,832,423

[45] Aug. 27, 1974

[54] CHEMICALLY JOINED, PHASE SEPARATED GRAFT COPOLYMERS HAVING HYDROCARBON POLYMERIC BACKBONES

[75] Inventors: Ralph Milkovich, Naperville; Mutong T. Chiang, Palos Heights, both of Ill.

[73] Assignee: CPC International, Inc., Englewood Cliffs, N.J.

[22] Filed: Apr. 14, 1972

[21] Appl. No.: 244,205

Related U.S. Application Data

[63] Continuation-in-part of Ser. No. 117,733, Feb. 22, 1971, abandoned.

[30] Foreign Application Priority Data

Feb. 8, 1972 Great Britain..................... 5907/72

[52] U.S. Cl............ 260/878 R, 260/82.1, 260/83.7, 260/85.3 R, 260/93.5, 260/88.2 F, 260/878 B, 260/879, 260/880 R, 260/880 B

[51] Int. Cl...................... C08f 15/00, C08f 19/00

[58] Field of Search............ 260/878 R, 878 B, 879, 260/880 R, 880 B, 88.2 F, 93.5 S, 85.3 R, 83.7, 82.1

[56] References Cited

UNITED STATES PATENTS

| | | | |
|---|---|---|---|
| 2,699,457 | 1/1955 | Ziegler et al.................. | 260/88.2 F |
| 3,135,717 | 6/1964 | Gregorian et al.................. | 260/879 |
| 3,235,626 | 2/1966 | Waack.............................. | 260/884 |
| 3,627,837 | 12/1971 | Webb............................. | 260/878 R |

FOREIGN PATENTS OR APPLICATIONS 595,217   3/1960   Canada..:............................ 260/879

OTHER PUBLICATIONS

Greber, V. G., "Ueber den Aufbau von Block– und Pfropfcopolymeren," Die Makromolekulare Chemie, 101, pp. 104–144, (1967).

Black, et al., "The Preparation of Some Block Copolymers," Journal of Applied Polymer Science, 14, pp. 1671–1677, (1970).

*Primary Examiner*—Joseph L. Schofer
*Assistant Examiner*—A. Holler
*Attorney, Agent, or Firm*—Albert P. Halluin

[57] ABSTRACT

The present invention relates to thermoplastic graft copolymers comprised of copolymeric backbones containing a plurality of uninterrupted repeating units of the backbone polymer and at least one integrally copolymerized moiety per backbone polymer chain having chemically bonded thereto a substantially linear polymer which forms a copolymerized sidechain to the backbone, wherein each of the polymeric sidechains has substantially the same molecular weight and each polymeric sidechain is chemically bonded to only one backbone polymer.

22 Claims, 22 Drawing Figures

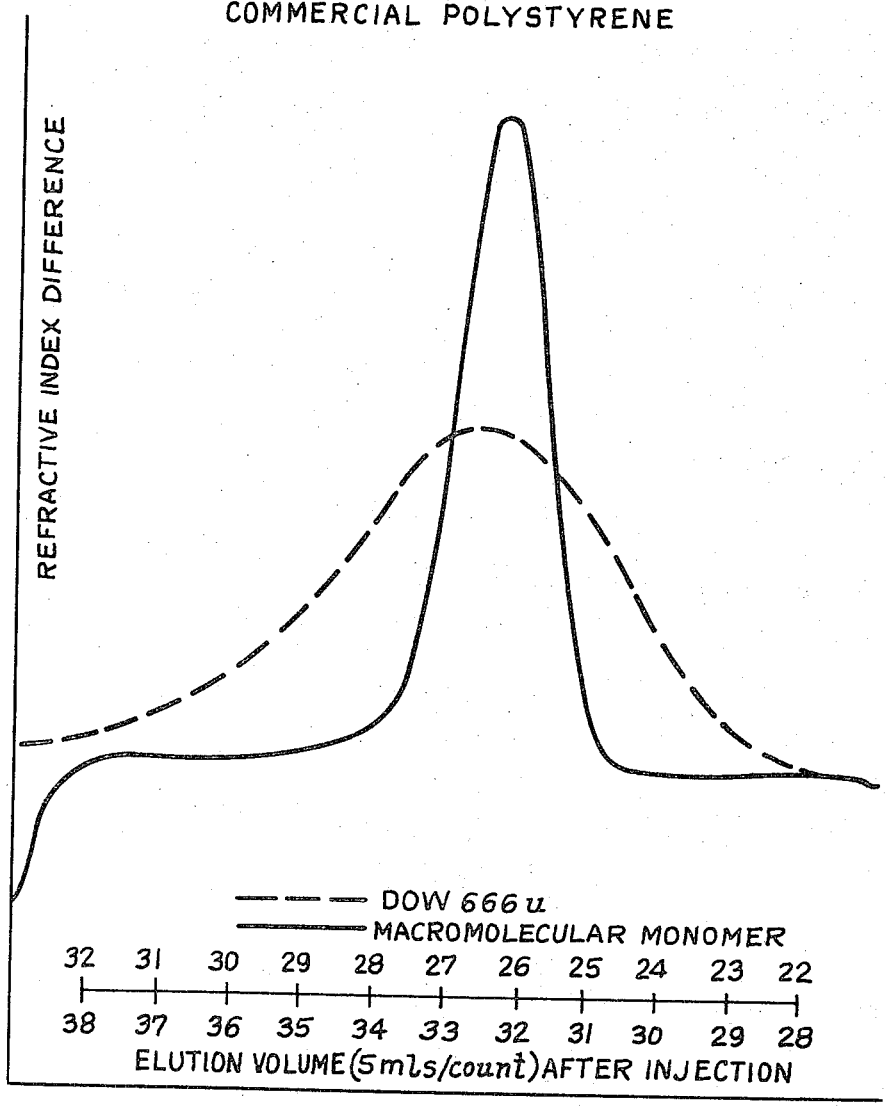
Fig. I.
GPC ANALYSIS OF POLYSTYRENE MACROMOLECULAR MONOMER VS COMMERCIAL POLYSTYRENE
--- DOW 666u
—— MACROMOLECULAR MONOMER
ELUTION VOLUME (5mls/count) AFTER INJECTION
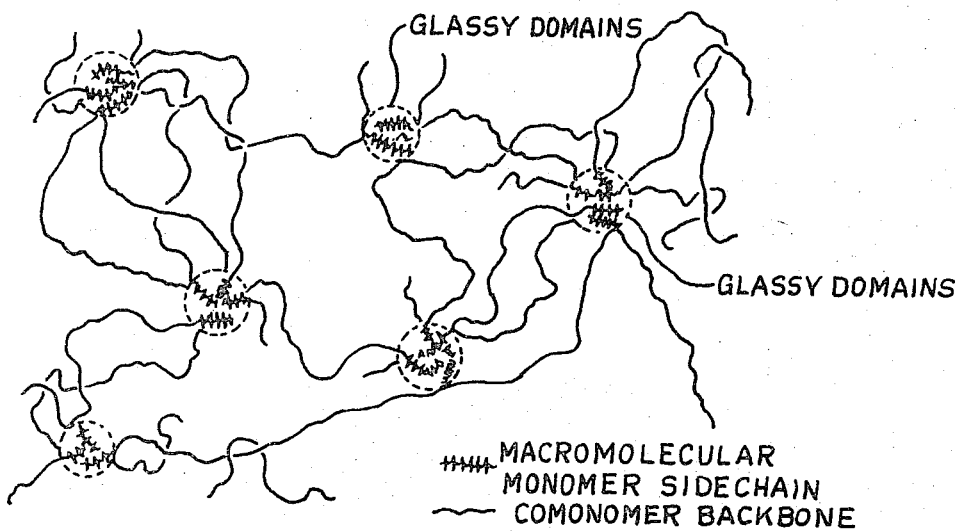
Fig. II.

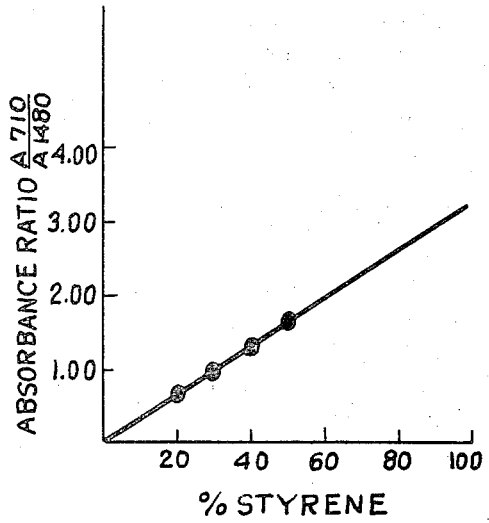
Fig. III.
I.R. CALIBRATION CURVE
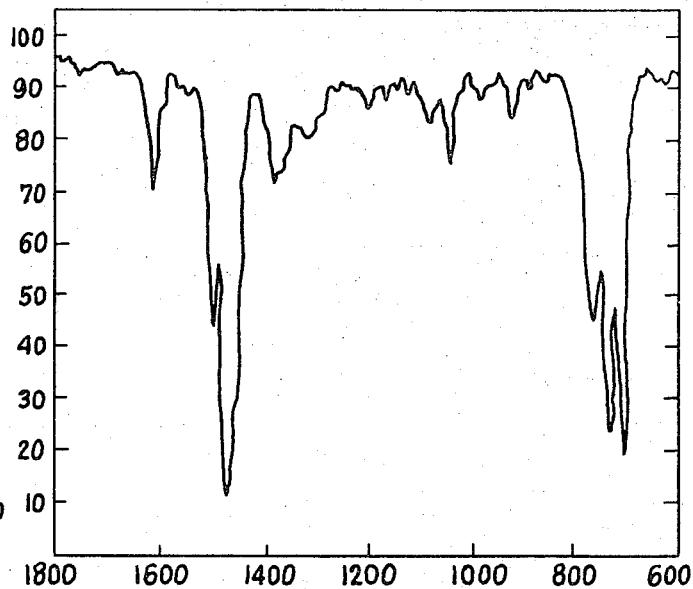
Fig. IV.
I.R. SPECTRA OF GRAFT COPOLYMER
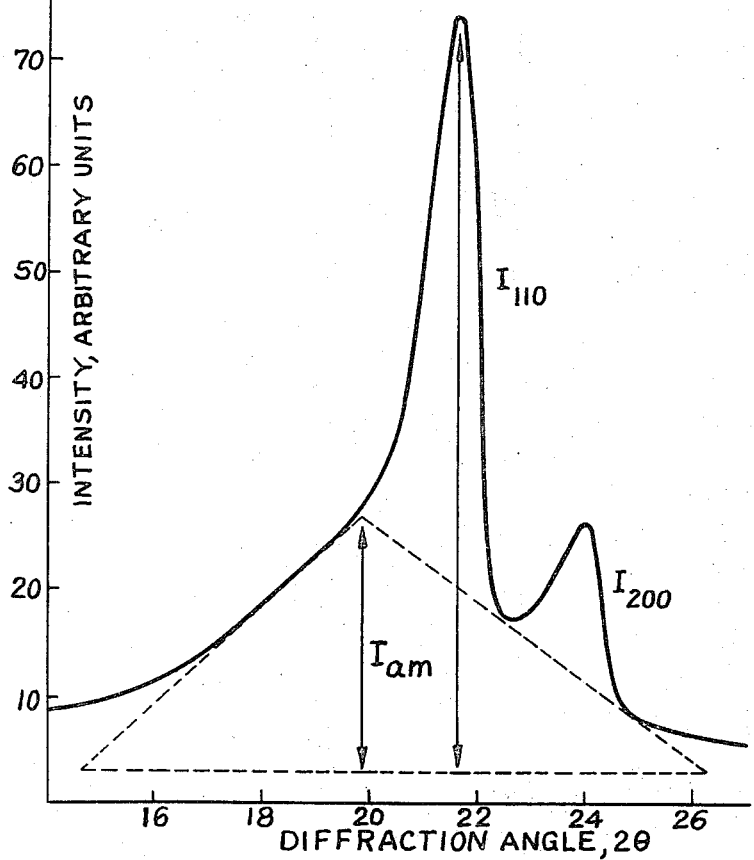
Fig. V.
DIFFRACTOMETER TRACING OF COPOLYMER CONTAINING 12% MACROMOLECULAR MONOMER

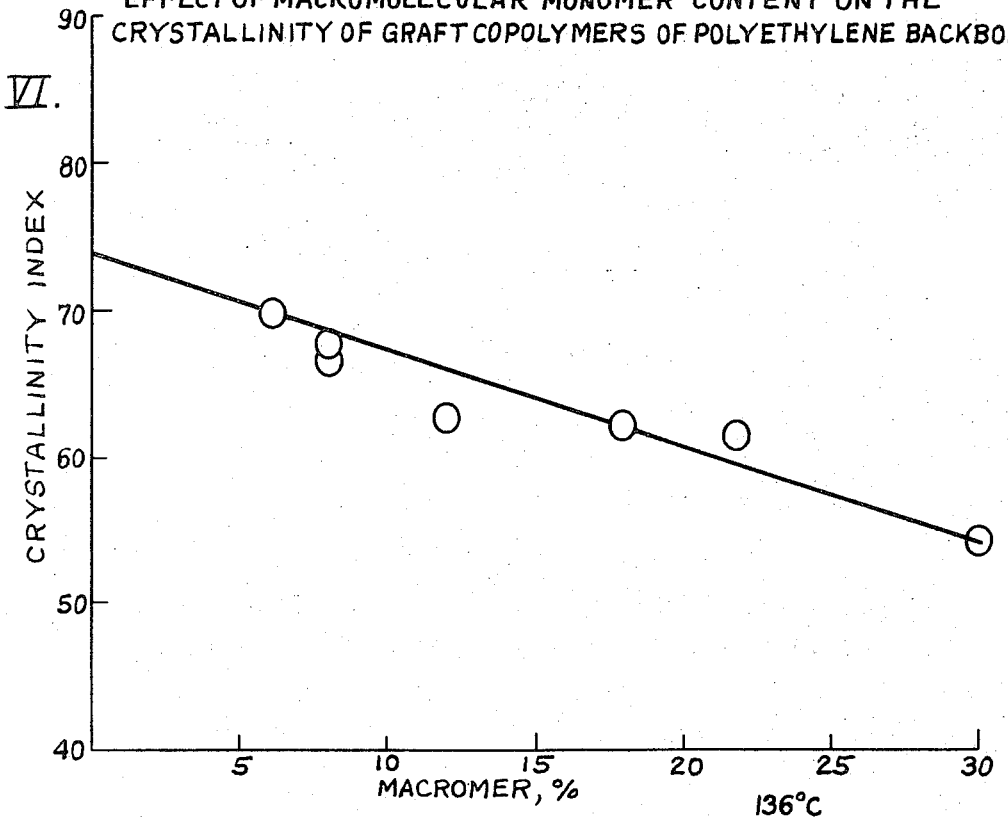
Fig. VI. Effect of macromolecular monomer content on the crystallinity of graft copolymers of polyethylene backbone
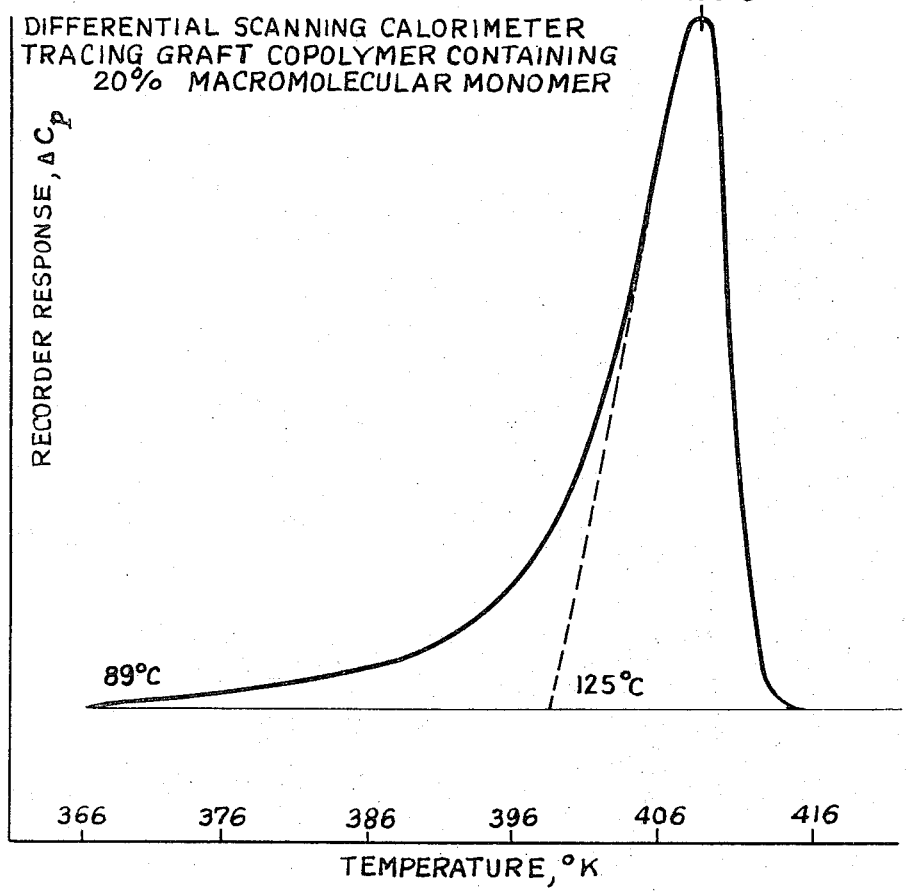
Fig. VII. Differential scanning calorimeter tracing graft copolymer containing 20% macromolecular monomer EFFECT OF STRETCHING ON POLYETHYLENE AND COPOLYMERS
HAVING POLYETHYLENE BACKBONE AND POLYSTYRENE SIDECHAINS
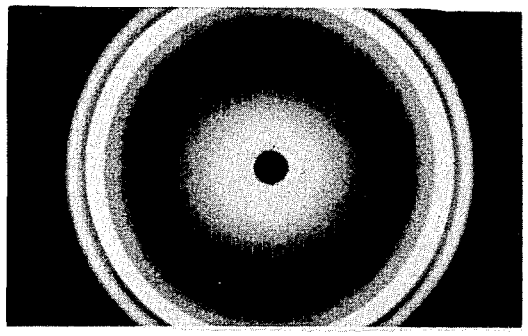
Fig. VIII (a).
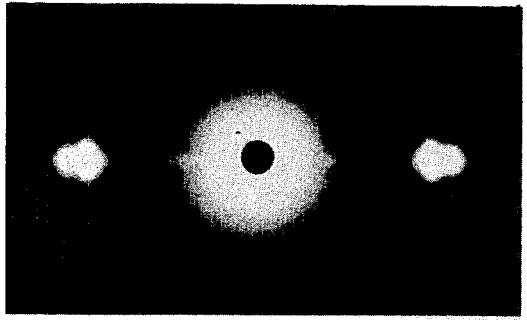
Fig. VIII (b).
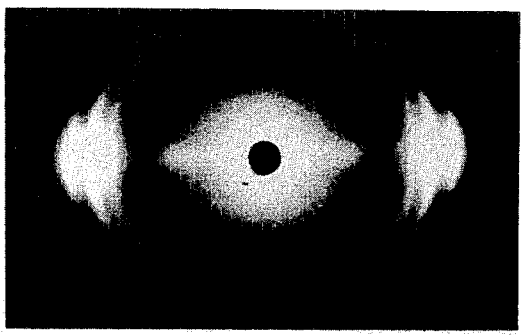
Fig. VIII (c).

EFFECT OF COPOLYMERIZATION ON
POLYETHYLENE SPHERULITE STRUCTURE
MOLDED FILMS, POLARIZED LIGHT
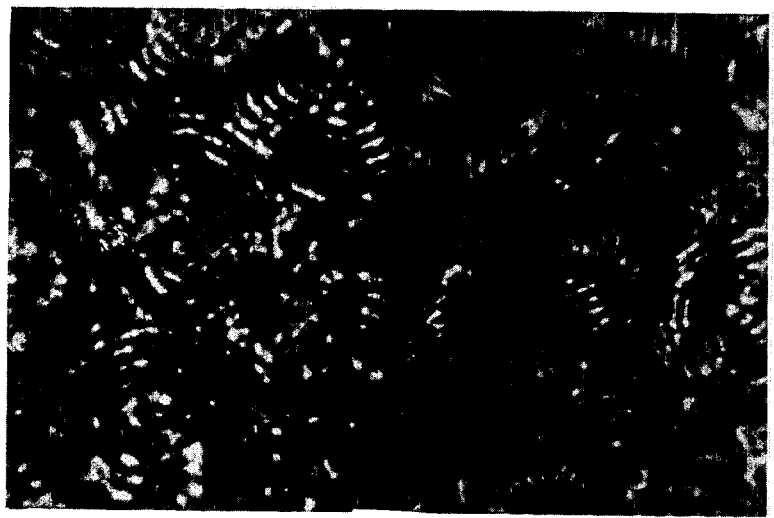
Fig. IX (a).
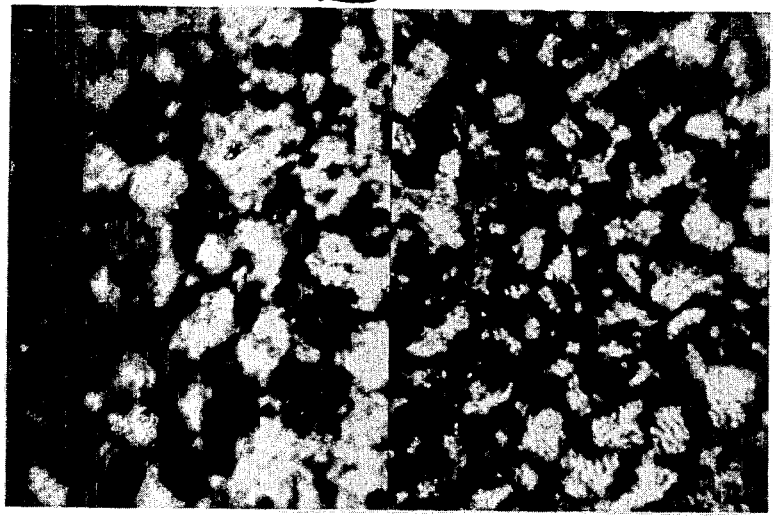
Fig. IX (b).

EFFECT OF MACROMOLECULAR MONOMER
COPOLYMERIZATION ON SPHERULITE STRUCTURE
FROM 1% TETRAHYDRONAPHTHALENE SOLUTION,
POLARIZED LIGHT
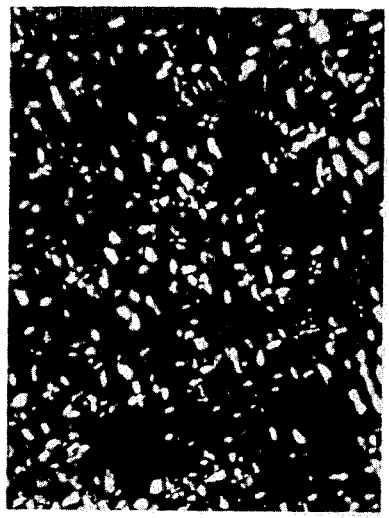
Fig. X(a).
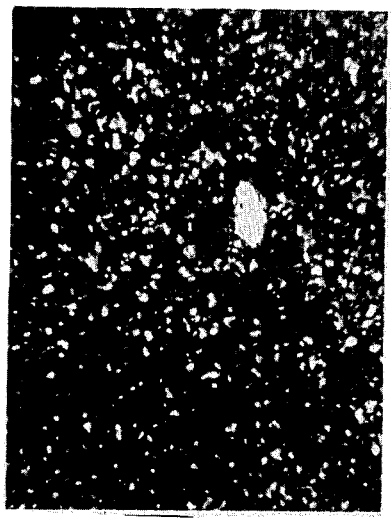
Fig. X(b).
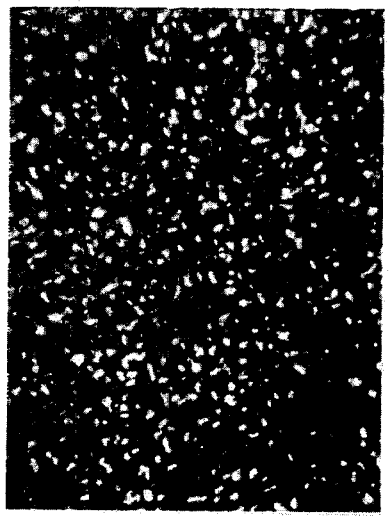
Fig. X(c).
Fig. X(d).

PHYSICAL BLENDS OF POLYSTYRENE
MACROMOLECULAR MONOMER AND POLYETHYLENE
FROM 1% TETRAHYDRONAPHTHALENE SOLUTIONS,
POLARIZED LIGHT
Fig. XI(a).
Fig. XI(b).
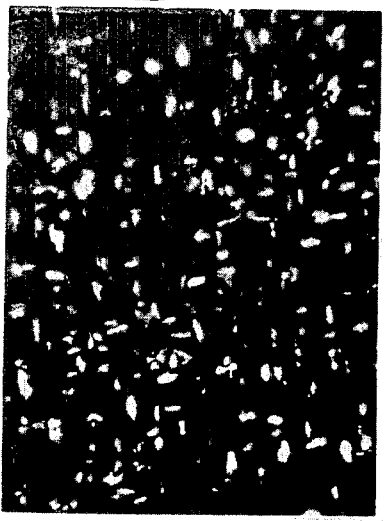
Fig. XI(c).
Fig. XI(d).

NORMALIZED STRESS-STRAIN PROPERTIES
VS
% MACROMOLECULAR MONOMER
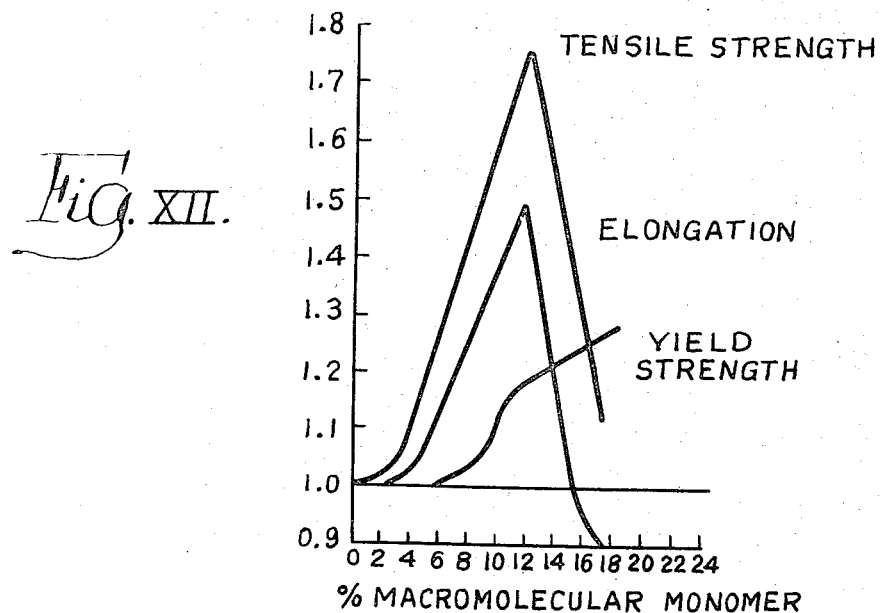
Fig. XII.
NORMALIZED FLEXURAL MODULUS
AND HEAT DEFLECTION
VS
% MACROMOLECULAR MONOMER
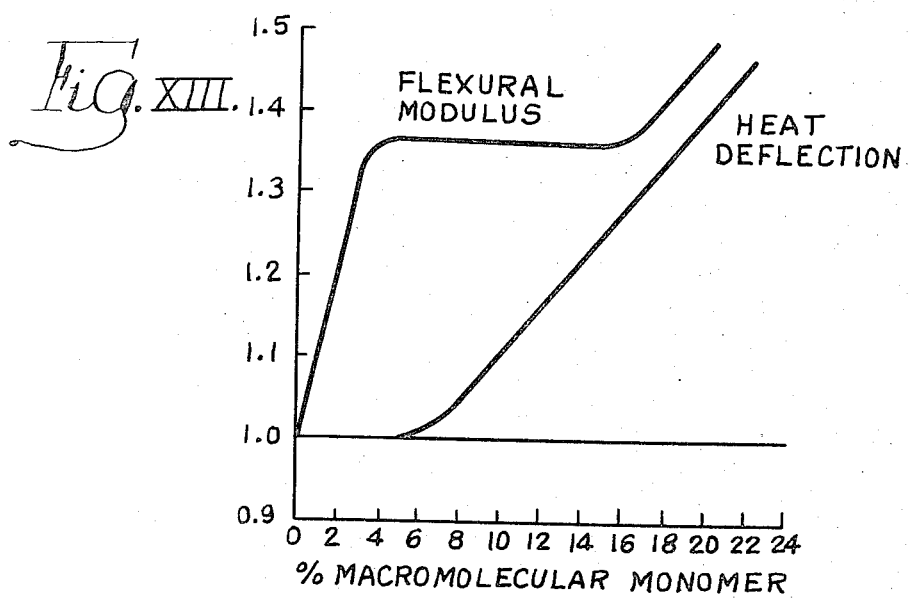
Fig. XIII.

CHEMICALLY JOINED, PHASE SEPARATED GRAFT COPOLYMERS HAVING HYDROCARBON POLYMERIC BACKBONES

CROSS-REFERENCE TO RELATED APPLICATION

This application is a continuation-in-part of copending application Ser. No. 117,733, filed Feb. 22, 1971 now abandoned.

BACKGROUND OF THE INVENTION

The present invention relates to chemically joined, phase separated thermoplastic graft copolymers.

Polymer technology has developed to a high degree of sophistication and extensive research efforts in this direction are being undertaken to obtain improvements in polymer properties. Some of these efforts lead to polymer materials capable of competing with metals and ceramics in engineering applications. Generally, it is a requirement that these polymers be crystalline, since crystalline polymers are strong, tough, stiff and generally more resistant to solvents and chemicals than their non-crystalline counterparts.

Many poly alpha-olefins are crystalline and have excellent structural integrity; and, accordingly, have acquired increasing commercial acceptance as materials for competing with metals and ceramics. As one example, polyethylene has been regarded as one of the most important polymers among the major plastics, with its production reaching about 6 billion pounds in 1970 (1.7 billion pounds of high density linear polyethylene and 4.3 billion pounds of low density polyethylene).

Despite the widespread use of this important plastic, its use has been limited to flexible, translucent, molded articles or flexible, clear films, due to its softness. The uses of polyethylene have also been limited due to its poor adhesion to many substrates and its low heat distortion, rendering it unsuitable for many high temperature applications.

Attempts by prior art workers to combine the properties of polyolefins and other polymers by either chemical or mechanical means generally has resulted in a sacrifice of many of the beneficial properties of both the polyolefin and the additional polymer. For example, graft copolymers of polyethylene and polypropylene have been prepared only with difficulty due to the inertness these polymers have with many other polymerizable monomers and polymers. The resultant graft copolymer generally has been a mixture which also contains free homopolymers.

Polyblends of a polyolefin with another polymer prepared by blending quantities of the two polymers together by mechanical means have been generally unsuitable for many applications due to their adverse solubility or extractability properties when used with various solvent systems, particularly when containing a rubbery, amorphous component.

The above considerations recognized by those skilled in the art with respect to the incompatibility of polyolefins with other polymers find almost equal applicability in the case of other plastics such as the polyacrylates, polymethacrylates, polyvinylchlorides, etc. Thus, the incompatibility of both natural and synthetic polymers becomes increasingly apparent as more and more polymers having particularly good properties for special uses have become available, and as efforts have been made to combine pairs of these polymers for the purpose of incorporating the different, good properties of each polymer into one product. More often than not, these efforts have been unsuccessful because the resulting blends have exhibited an instability, and in many cases the desired properties of the new polymers were completely lost. As a specific example, polyethylene is incompatible with polystyrene and a blend of the two has poorer physical properties than either of the homopolymers. These failures were at first attributed to inadequate mixing procedures, but eventually it was concluded that the failures were due simply to the inherent incompatabilities. Although it is now believed that this is a correct explanation, the general nature of such incompatability has remained somewhat unclear, even to the present. Polarity seems to be a factor, i.e., two polar polymers are apt to be more compatible than a polar polymer and a non-polar polymer. Also, the two polymers must be structurally and compositionally somewhat similar if they are to be compatible. Still further, a particular pair of polymers may be compatible only within a certain range of relative proportions of the two polymers; outside that range they are incompatible.

Despite the general acceptance of the fact of incompatibility of polymer pairs, there is much interest in devising means whereby the advantageous properties of combinations of polymers may be combined into one product.

One way in which this objective has been sought involves the preparation of block or graft copolymers. In this way, two different polymeric segments, normally incompatible with one another, are joined together chemically to give a sort of forced compatibility. In such a copolymer, each polymer segment continues to manifest its independent polymer properties. Thus, the block or graft copolymer in many instances possesses a combination of properties not normally found in a homopolymer or a random copolymer.

Recently, U.S. Pat. No. 3,235,626 to waack, assigned to Dow Chemical Company, described a method for reparing graft copolymers of controlled branch configuration. It is described that the graft copolymers are prepared by first preparing a prepolymer by reacting a vinyl metal compound with an olefinic monomer to obtain a vinyl terminated prepolymer. After protonation and catalyst removal, the prepolymer is dissolved in an inert solvent with a polymerization catalyst and is thereafter reacted with either a different polymer having a reactive vinyl group or a different vinyl monomer.

The current limitations on the preparation of these copolymers are mechanistic. Thus, there is no means for controlling the spacing of the sidechains along the backbone chain and the possibility of the sidechains having irregular sizes. Due to the mechanistic limitations of the prior art methods, i.e., the use of an alpha-olefin terminated prepolymer with acrylonitrile or an acrylate monomer, complicated mixtures of free homopolymers result.

In view of the above considerations, it would be highly desirable to devise a means for preparing graft copolymers wherein the production of complicated mixtures of free homopolymers is minimized and the beneficial properties of the sidechain and backbone polymer are combined in one product.

SUMMARY OF THE INVENTION

The present invention relates to thermoplastic graft copolymers comprised of copolymeric backbones containing a plurality of uninterrupted repeating units of the backbone polymer and at least one integrally copolymerized moiety per backbone polymer chain having chemically bonded thereto a substantially linear polymer which forms a copolymerized sidechain to the backbone, wherein each of the polymeric sidechains has substantially the same molecular weight and each polymeric sidechain is chemically bonded to only one backbone polymer.

The graft copolymers of the present invention assume a T- type structure when only one sidechain is copolymerized into the copolymeric backbone. However, when more than one sidechain is copolymerized into the backbone polymer, the graft copolymer may be characterized as having a comb-type structure illustrated in the following manner:

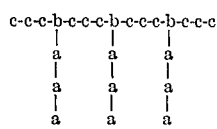

wherein "a" represents a substantially linear, uniform molecular weight polymer or copolymer having a sufficient molecular weight such that the physical properties of at least one of the substantially linear polymers are manifest; "b" represents a reacted and polymerized end group chemically bonded to the sidechain, "a," which is integrally polymerized into the backbone polymer, and "c" is the backbone polymer having uninterrupted segments of sufficient molecular weight such that the physical properties of the polymer are manifest.

The backbone of the graft copolymers of the present invention preferably contains at least about 20 uninterrupted recurring monomeric units in each segment. It has been found that this condition provides the graft copolymer the properties of the polymer. In other words, the presence of segments containing at least about 20 uninterrupted recurring monomeric units provides the graft copolymers with the physical properties attributed to this polymer, such as crystalline melting point (Tm) and structural integrity.

As will be explained hereinafter, the excellent combination of beneficial properties possessed by the graft copolymers of the present invention are attributed to the large segments of uninterrupted copolymeric backbones and the integrally copolymerized linear sidechains of controlled molecular weight and narrow molecular weight distribution.

The backbone polymers of the present invention are comprised of polyolefins which include polymers of alpha-olefins of the formula:

$$CH_2 = CHR$$

wherein R is either hydrogen, or an alkyl or aryl radical containing one to about 16 carbon atoms, and include ethylene, propylene, butene-1, pentene-1, hexene-1, styrene, etc.; copolymers of alpha-olefins including the ethylene-propylene copolymers; and polymers of polymerizable dienes including butadiene, isoprene, etc.

The sidechain polymers having substantially uniform molecular weight are comprised of substantially linear polymers and copolymers produced by anionic polymerization of any anionically polymerizable monomer, as will be described hereinafter. Preferably, the sidechain polymer will be different than the backbone polymer.

The term "linear," referred to hereinabove, is being used in its conventional sense, to pertain to a polymeric backbone that is free from cross-linking.

It is preferred that at least one segment of the sidechain polymer of the graft copolymers of the present invention have a molecular weight sufficient to manifest the beneficial properties of the respective polymer. In other words, physical properties of the sidechain polymer such as the glass transition temperature (Tg) will be manifest. Generally, as known in the art, the average molecular weight of the segment of the polymeric sidechains necessary to establish the physical properties of the polymer will be from about 5,000 to about 50,000.

In light of the unusual and improved physical properties possessed by the thermoplastic graft copolymers of the present invention, it is believed that the monofunctionally bonded polymeric sidechains having substantially uniform molecular weight form what is known as "glassy domains" representing areas of mutual solubility of the respective sidechain polymers from separate backbone copolymers.

BRIEF DESCRIPTION OF THE DRAWINGS

FIG. I illustrates a graphic comparison of a gel permeation chromatogram analysis of alpha-olefin terminated polystyrene used as one of the macromolecular monomers to make the sidechains of the graft copolymers of the present invention and commercial polystyrene produced by free-radical catalysis.

FIG. II is a diagramatic illustration of the graft copolymers of the invention showing the "glassy domains" of the sidechains.

FIG. III illustrates the infrared spectroscopy calibration curves for polyethylene blended with polystyrene.

FIG. IV illustrates the infrared spectroscopy of the polyethylene graft copolymers.

FIG. V illustrates a diffractometer tracing of styrene macromolecular monomer (12 percent) copolymerized with polyethylene.

FIG. VI illustrates the effect of the macromolecular weight content on the crystallinity of the polyethylene graft copolymers of the present invention.

FIG. VII illustrates the differential scanning calorimeter tracing of the polyethylene graft copolymer having 20 percent macromolecular monomer.

FIGS. VIII a, b and c illustrate X-ray diffraction patterns of unstretched polyethylene, stretched polyethylene and stretched graft copolymer having polyethylene backbone and polystyrene sidechains (20 percent by weight incorporation).

FIGS. IX a and b illustrate the effect of the grafted polystyrene sidechains on polyethylene spherulite structure of molded films with polarized light.

FIGS. X a, b, c and d illustrate the effect of the grafted sidechains on polyethylene on the spherulite structure from a 1 percent tetrahydronaphthalene solution with a polarized light as compared with polyethylene not copolymerized with the macromolecular monomer.

FIGS. XI a, b, c and d illustrate a comparison of a physical mixture of a macromolecular monomer (Macromer) and polyethylene at 5 10 and 20 percent showing no change in spherulitic structure.

FIG. XII illustrates the normalized stress-strain properties versus percent polystyrene macromolecular monomer incorporation in polyethylene.

FIG. XIII illustrates the normalized flexural modulus and heat deflection versus percent polystyrene macromolecular monomer incorporation in polyethylene.

DESCRIPTION OF THE PREFERRED EMBODIMENTS OF THE INVENTION

Briefly, the graft copolymers of polyolefins of the present invention are prepared by first preparing the sidechains in the form of monofunctional living polymers of substantially uniform molecular weight. The living polymers are thereafter terminated, as by reaction with a halogen-containing compound that also contains a reactive polymerizable group, such as, for example, a polymerizable olefinic or epoxy group. The monofunctional terminated living polymer chains are then polymerized, together with the backbone monomer, to form a graft copolymer of a polyolefin wherein the polymeric sidechains are integrally polymerized into the polyolefin backbone.

Graft copolymers of polyolefin backbones from alpha-olefins produced in accordance with the practice of the present invention generally correspond to the structural formula:

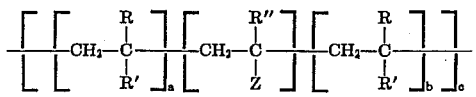

wherein R, R' and R'' are each selected from the group consisting of hydrogen, lower alkyl and phenyl radicals; Z is a substantially linear polymer or copolymer wherein at least one segment of the polymer has a sufficient molecular weight to manifest the properties of the respective polymer; the symbols a, b and c are positive integers, with the proviso that a and b are each a value such that the physical properties of the uninterrupted segments in the backbone, e.g., Tm, are manifest, preferably at least about 20; and the symbol c is at least one, but preferably greater than one, e.g., a value such that the molecular weight of the graft copolymer will be up to about 2 million.

The formation of the graft copolymers of the present invention may be better understood by reference to the following reactions illustrated by the equations set forth below wherein the preferred embodiment of the invention is illustrated in terms of polystyrene sidechains and polyethylene backbones. It can be seen from these equations that the first reactions involve the preparation of living polymers of polystyrene. The living polymers are thereafter reacted with a molar equivalent of allyl chloride, wherein the reaction takes place at the carbon-chloride bond, rather than at the carbon-carbon double bond. The vinyl terminated polystyrene, referred to herein as the alpha-olefin terminated macromolecular monomer, is then copolymerized with ethylene to produce a graft copolymer of polyethylene, whereby the vinyl moiety of the polystyrene is integrally polymerized into the linear polyethylene backbone.

Alternatively, the living polymer can be reacted with an epoxide such as, for example, ethylene oxide, to produce an alkoxide ion which can then be reacted with the halogen-containing olefin, i.e., allyl chloride, to produce an alpha-olefin terminated macromolecular monomer. This, in essence, places the terminal alpha-olefin farther away from the aromatic ring of the polystyrene and therefore reduces any steric hindering influence that might be exerted by the aromatic ring.

FORMATION OF THE GRAFT COPOLYMER OF ALPHA-OLEFIN TERMINATED POLYSTYRENE SIDECHAIN AND POLYETHYLENE BACKBONE

Initiation: 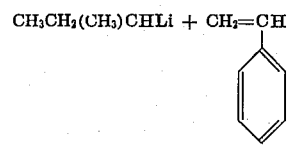

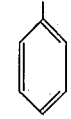

Propagation:

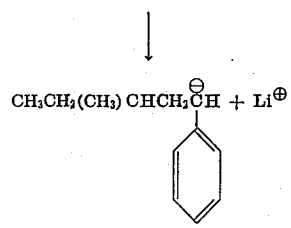

Termination with Active End Group:

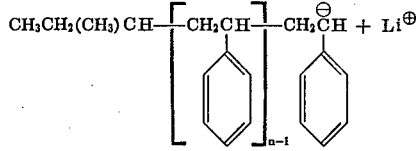

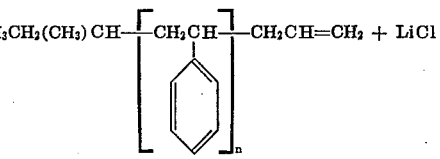

Graft Copolymerization: $xCH_2=CH_2$ + Polymerization Catalyst

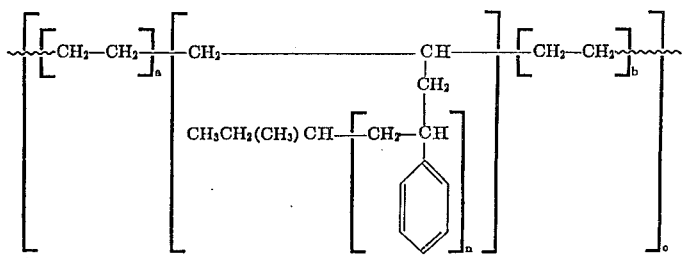

In the equations above, the symbols $a$, $b$, $c$, $n$ and $x$ are positive integers wherein $a$ and $b$ are at least about 20, $n$ has a value of from about 50 to about 500, and $x$ has a value corresponding approximately to the sum of $a$ and $b$.

PREPARATION OF THE LIVING POLYMERS

The sidechains of the polyolefin graft copolymers, as noted above, are preferably prepared by the anionic polymerization of a polymerizable monomer or combination of monomers. In most instances, such monomers are those having an olefinic group, although they may contain an epoxy or thioepoxy group. The living polymers are conveniently prepared by contacting the monomer with an alkali metal hydrocarbon or alkoxide salts in the presence of an inert organic diluent which does not participate in or interfere with the polymerization reaction.

Those monomers susceptible to anionic polymerization are well-known and the present invention contemplates the use of all anionically polymerizable monomers. Non-limiting illustrative species include vinyl aromatic compounds, such as styrene, alpha-methylstyrene, vinyl toluene and its isomers; vinyl unsaturated amides such as acrylamide, methacrylamide, N,N-dilower alkyl acrylamides, e.g., N,N-dimethylacrylamide; acenaphthalene; 9-acrylcarbazole; acrylonitrile and methacrylonitrile; organic isocyanates including lower alkyl, phenyl, lower alkyl phenyl and halophenyl isocyanates, organic diisocyanates including lower alkylene, phenylene and tolylene diisocyanates; lower alkyl and allyl acrylates and methacrylates, including methyl, t-butyl acrylates and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl oleate, vinyl stearate, vinyl benzoate; vinyl lower alkyl ethers; vinyl pyridines, vinyl pyrrolidones; dienes including isoprene and butadiene; and lower alkylene oxides. The term "lower" is used above to denote organic groups containing eight or fewer carbon atoms.

Many other monomers suitable for the preparation of the sidechains by anionic polymerization are those disclosed in *Macromolecular Reviews:* Volume 2, pages 74–83, Interscience Publishers, Inc. (1967), entitled "Monomers Polymerized by Anionic Initiators," the disclosure of which is incorporated herein by reference.

The initiators for these anionic polymerizations are any alkali metal hydrocarbons and alkoxide salts which produce a monofunctional living polymer, i.e., only one end of the polymer contains a reactive carbanion. Those catalysts found suitable include the hydrocarbons of lithium, sodium or potassium as represented by the formula RMe wherein Me is an alkali metal such as sodium, lithium or potassium and R represents a hydrocarbon radical, for example, an alkyl radical containing up to about 20 carbon atoms or more, and preferably up to about eight carbon atoms, an aryl radical, an alkaryl radical or an aralkyl radical. Illustrative alkali metal hydrocarbons include ethyl sodium, n-propyl sodium, n-butyl potassium, n-octyl potassium, phenyl sodium, ethyl lithium, sec-butyl lithium, t-butyl lithium and 2-ethylhexyl lithium. Sec-butyl lithium is the preferred initiator because it has a fast initation which is important in preparing polymers of narrow molecular weight distribution. It is preferred to employ the alkali metal salts of tertiary alcohols, such as potassium t-butyl alkoxylate, when polymerizing monomers having a nitrile or carbonyl functional group.

The alkali metal hydrocarbons and alkoxylates are either available commercially or may be prepared by known methods, such as by the reaction of a halohydrocarbon, halobenzene or alcohol and the appropriate alkali metal.

An inert solvent generally is used to facilitate heat transfer and adequate mixing of initiator and monomer. Hydrocarbons and ethers are the preferred solvents. Solvents useful in the anionic polymerization process include the aromatic hydrocarbons such as benzene, toluene, xylene, ethylbenzene, t-butylbenzene, etc. Also suitable are the saturated aliphatic and cycloaliphatic hydrocarbons such as n-hexane, n-heptane, n-octane, cyclohexane and the like. In addition, aliphatic and cyclic ether solvents can be used, for example, dimethyl ether, diethyl ether, dibutyl ether, tetrahydrofuran, dioxane, anisole, tetrahydropyran, diglyme, glyme, etc. The rates of polymerization are faster in the ether solvents than in the hydrocarbon solvents, and small amounts of ether in the hydrocarbon solvent increase the rates of polymerization.

The amount of initiator is an important factor in anionic polymerization because it determines the molecular weight of the living polymer. If a small proportion of initiator is used, with respect to the amount of monomer, the molecular weight of the living polymer will be larger than if a large proportion of initiator is used. Generally, it is advisable to add intiator dropwise to the monomer (when that is the selected order of addition) until the persistence of the characteristic color of the organic anion, then add the calculated amount of initiator for the molecular weight desired. The preliminary dropwise addition serves to destroy contaminants and thus permits better control of the polymerization.

To prepare a polymer of narrow molecular weight distribution, it is generally preferred to introduce all of the reactive species into the system at the same time. By this technique, polymer growth by consecutive addition of monomer takes place at the same rate to an active terminal group, without chain transfer or termination reaction. When this is accomplished, the molecular weight of the polymer is controlled by the ratio of monomer to initiator, as seen from the following representation:

$$\text{Molecular Weight Of Living Polymer} = \frac{\text{Moles of Monomer}}{\text{Moles of Initiator}} \times \text{Molecular Weight Of Monomer}$$

As it can be seen from the above formula, high concentrations of initiator leads to the formation of low molecular weight polymers, whereas, low concentrations of initiator leads to the production of high molecular weight polymers.

The concentration of the monomer charged to the reaction vessel can vary widely, and is limited by the ability of the reaction equipment to dissipate the heat of polymerization and to properly mix the resulting viscous solutions of the living polymer. Concentrations of monomer as high as 50 percent by weight or higher based on the weight of the reaction mixture can be used. However, the preferred monomer concentration is from about 5 percent to about 25 percent in order to achieve adequate mixing.

As can be seen from the formula above and the foregoing limitations on the concentration of the monomer, the initiator concentration is critical, but may be varied according to the desired molecular weight of the living polymer and the relative concentration of the monomer. Generally, the initiator concentration can range from about 0.001 to about 0.1 mole of active alkali metal per mole of monomer, or higher. Preferably, the concentration of the initiator will be from about 0.01 to about 0.004 mole of active alkali metal per mole of monomer.

The temperature of the polymerization will depend on the monomer. Generally, the reaction can be carried out at temperatures ranging from about −100°C up to about 100°C. When using aliphatic and hydrocarbon diluents, the preferred temperature range is from about −10°C to about 100°C. With ethers as the solvent, the preferred temperature range is from about −100°C to about 100°C. The polymerization of the styrene is generally carried out as slightly above room temperature; the polymerization of alpha-methylstyrene preferably is carried out at lower temperatures, e.g., −80°C.

The preparation of the living polymer can be carried out by adding a solution of the alkali metal hydrocarbon initiator in an inert organic solvent to a mixture of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to a living polymer as long as the system remains free of impurities which inactivate the anionic species. As pointed out above, however, it is important to add all of the reactive ingredients together rapidly to insure the formation of a uniform molecular weight distribution of the polymer.

The anionic polymerization must be carried out under carefully controlled conditions, so as to exclude substances which destroy the catalytic effect of the catalyst or initiator. For example, such impurities as water, oxygen, carbon monoxide, carbon dioxide, and the like. Thus, the polymerizations are generally carried out in dry equipment, using anhydrous reactants, and under an inert gas atmosphere, such as nitrogen, helium, argon, methane, and the like.

The above-described living polymers are susceptible to further reactions including further polymerization. Thus, if additional monomer, such as styrene, is added to the living polymer, the polymerization is renewed and the chain grows until no more monomeric styrene remains. Alternatively, if another different anionically polymerizable monomer is added, such as butadiene or ethylene oxide, the above-described living polymer initiates the polymerization of the butadiene or ethylene oxide and the ultimate living polymer which results consists of a polystyrene segment and a polybutadiene or polyoxyethylene segment.

As noted above, the living polymers employed in the present invention are characterized by relatively uniform molecular weight, i.e., the distribution of molecular weights of the mixture of living polymers produced is quite narrow. This is a marked contrast to the typical polymer, where the molecular weight distribution is quite broad. The difference in molecular weight distribution is particularly evident from an analysis of the gel permeation chromatogram of commercial polystyrene (Dow 666μ) prepared by free-radical polymerization and polystyrene produced by the anionic polymerization process utilized in accordance with the practice of the present invention, as illustrated in FIG. 1 of the drawings.

PRODUCTION OF THE MACROMOLECULAR MONOMERS BY TERMINATION OF THE LIVING POLYMERS

The living polymers herein are terminated by reaction with a halogen-containing compound which also contains a polymerizable moiety, such as an olefinic group or an epoxy or thioepoxy group. Suitable halogen-containing terminating agents include: the vinyl haloalkyl ethers wherein the alkyl groups contain six or fewer carbon atoms such as methyl, ethyl, propyl, butyl, isobutyl, sec-butyl, amyl or hexyl, vinyl esters or haloalkanoic acids wherein the alkanoic acid contains six or fewer carbon atoms, such as acetic, propanoic, butyric, pentanoic, or hexanoic acid; olefinic halides having six or fewer carbon atoms such as vinyl halide, allyl halide, methallyl halide, 6-halo-1-hexene, etc.; halides of dienes such as 2-halomethyl-1,3-butadiene; epihalohydrins; acrylyl and methacrylyl halides, haloalkylmaleic anhydrides; haloalkylmaleate esters; vinyl haloalkylsilanes; vinyl haloaryls; and vinyl haloalkaryls, such as vinylbenzyl chloride (VBC); anhydrides such as maleic anhydrides; haloalkyl norbornenes, such as bromomethyl norbornene, bromonorbornane and epoxy compounds such as ethylene or propylene oxide. The halo group may be chloro, fluoro, bromo, or iodo; preferably, it is chloro. The following equations illustrate the typical termination reactions in accordance with the practice of the present invention:

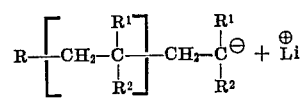

Terminating Agents:

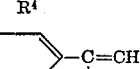

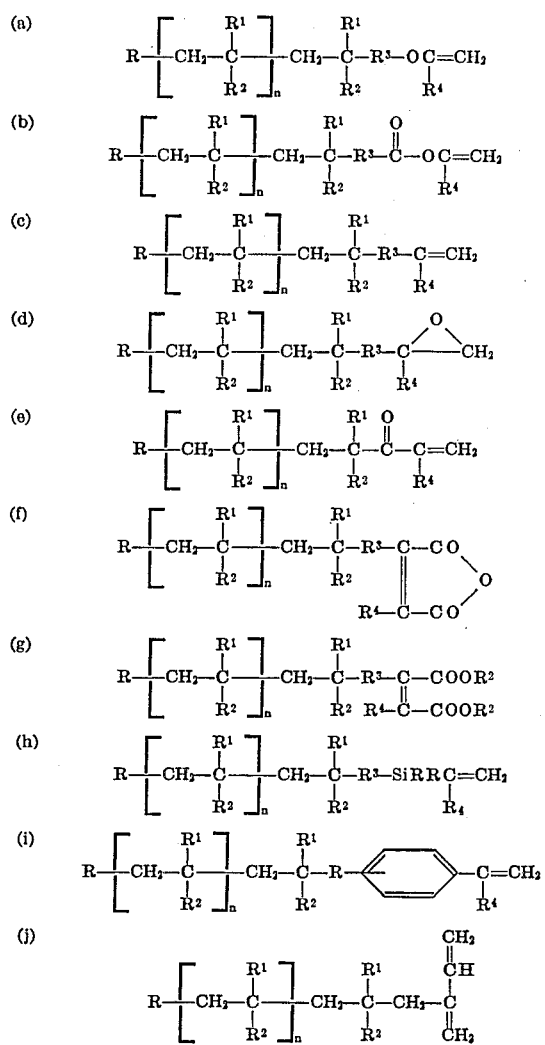

In the above equations, R, $R^1$, $R^2$, $R^3$ and $R^4$ are each selected from the group consisting of hydrogen and lower alkyl, and aryl radicals. Preferably, R will be lower alkyl, such as sec-butyl; $R^1$ will be either hydrogen or methyl; $R^2$ will be phenyl; $R^3$ will be hydrogen or lower alkylene radical; and $R^4$ will be either hydrogen or lower alkyl radical. The symbol $n$ is a positive integer such that the properties of the polymer are manifest.

Termination of the living polymer by any of the above types of terminating agents is accomplished simply by adding the terminating agent to the solution of living polymer at the temperature at which the living polymer is prepared. Reaction is immediate and the yield is theoretical. A slight molar excess of the terminating agent, with respect to the amount of catalyst, may be used although the reaction proceeds on a mole-for-mole basis.

The termination may be conducted in any suitable inert solvent. Generally, it is advisable to utilize the same solvent system employed in the preparation of the living polymer. A preferred embodiment of the invention comprises conducting the termination reaction in a hydrocarbon solvent rather than the polar ether type solvents such as tetrahydrofuran. It has been found that the hydrocarbon solvents such as the aromatic hydrocarbons, saturated aliphatic and cycloaliphatic hydrocarbons cause several differences in the reaction conditions and the resulting product. For example, the termination reaction can be conducted at higher temperatures with hydrocarbon solvents as opposed to the ether solvents.

In some instances, because of the nature of the living polymer and the monomer from which it is prepared, or because of the nature of the terminating agent, certain deleterious side reactions occur which result in an impure product. For example, the anion of some living polymers have a tendency to react with functional groups or any active hydrogens of the terminating agent. Thus, for example, acrylyl or methacrylyl chloride while they act as terminating agents because of the presence of the chlorine atom in their structure, they also provide a carbonyl group in the terminated polymer chain, and this carbonyl group may provide a center for attack by a second highly reactive living polymer. The resulting polymer either has twice the expected molecular weight or contains some chlorine, indicating that some of the living polymer has been terminated by reaction with a second living polymer or with one of the active hydrocarbons of the acrylyl or methacrylyl chloride.

It has been discovered that one means for overcoming the foregoing problem is to render the reactive anion less susceptible to reaction with the functional groups or any active hydrogens of a terminating agent. A preferred method to render the living polymer less susceptible to the adverse reaction is to "cap" the highly reactive living polymer with a lesser reactive reactant. Examples of some preferred "capping agents" include the lower alkylene oxides, i.e., one having eight or fewer carbon atoms such as ethylene and propylene oxide; diphenyl ethylene, etc. The "capping" reaction yields a product which still is a living polymer, but yields a purer product when subsequently reacted with a terminating agent containing a functional group or active hydrogen.

It has been found that diphenyl ethylene is an excellent "capping agent" when terminating agents such as, for example, vinyl chloroalkanoates are employed.

A particularly preferred "capping agent" is an alkylene oxide, such as ethylene oxide. It reacts with the living polymer, with the destruction of its oxirane ring. The following is a typical illustration of the "capping reaction" which shows the reaction of ethylene oxide as a capping agent with a living polymer prepared by the polymerization of styrene with sec-butyl lithium as the initiator:

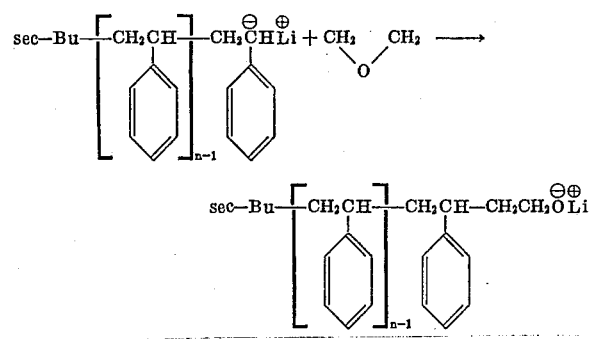

The capping reaction is carried out quite simply, as in the case of the terminating reaction, by adding the capping reactant to the living polymer at polymerization temperatures. The reaction occurs immediately. As in the case of the termination reaction, a slight molar excess of the capping reactant with respect to the amount of initiator may be used. The reaction occurs on a mole-for-mole basis.

It will be understood that when a large molar excess of alkylene oxide is reacted with the living polymer, a living polymer having two polymeric blocks is produced. A typical example with polystyrene segments and polyoxyalkylene segments is illustrated as follows:

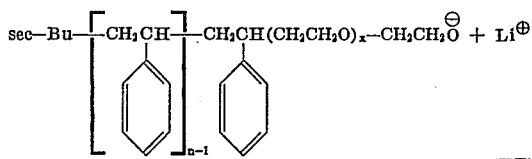

wherein $x$ is a positive integer.

Either of the above-described ethylene oxide "capped" polymers can be conveniently terminated with a compound containing moiety reactive with the anion of the capped polymer and a polymerizable end group, including the following typical compounds: acrylyl chloride, methacrylyl chloride, vinyl-2-chloroethyl ether, vinyl chloroacetate, chloromethylmaleic anhydride and its esters, maleic anhydride (yields half ester of maleic acid following protonation with water), allyl and methallyl chloride and vinylbenzyl chloride.

The reaction of the above-described "capped" living polymers with either acrylyl or methacrylyl chloride can be represented by the following reaction:

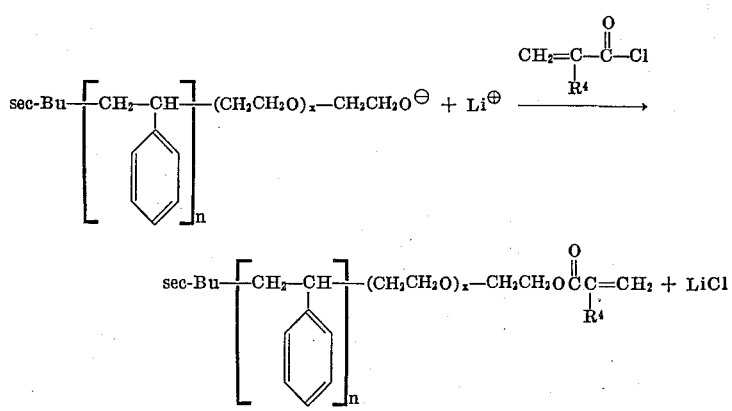

wherein $n$ is a positive integer of about at least 50, $x$ is either 0 or a positive integer and $R^4$ is either hydrogen or methyl.

When an epihalohydrin is used as the terminating reagent, the resulting polymer contains a terminal epoxy group. This terminal epoxy may be used as the polymerizable group itself, such as in the preparation of a polyisobutylene or a polypropylene oxide backbone graft copolymer or may be converted to various other useful polymerizable end groups by any one of several known reactions.

As one embodiment of the invention, the terminated polymer containing an epoxy or thioepoxy end group may be reacted with a polymerizable carboxylic acid halide, such as acrylic, methacrylic, or maleic acid halide, to produce a beta-hydroxyalkyl acrylate, methacrylate or maleate ester as the polymerizable terminal moiety of the substantially uniform molecular weight polymer. These same polymerizable esters may be prepared from the terminal epoxy polymer by first converting the epoxy group to the corresponding glycol by warming the polymer with aqueous sodium hydroxide, followed by conventional esterification of the glycol end group with the appropriate polymerizable carboxylic acid, or acid halide.

The resulting glycol obtained by the aqueous hydrolysis of the epoxy group in the presence of a base may be converted to a copolymer by reaction with a high molecular weight dicarboxylic acid which may be prepared, e.g., by the polymerization of a glycol or diamine with a molar excess of phthalic anhydride, maleic anhydride, succinic anhydride, or the like. These reactions can be modified to obtain a polystyrene block and a polyamide block (nylon). The glycol terminated polymer may also be reacted with a diisocyanate to form a polyurethane. The diisocyanate may be e.g., the reaction product of a polyethylene glycol having an average molecular weight of 400 with a molar excess of phenylene diisocyanate.

In another embodiment of the invention, an organic epoxide is copolymerized with a terminated polymer containing an epoxy or thioepoxy end group. The graft copolymer which results is characterized by a backbone having uninterrupted segments of at least about 20, and preferably at least about 30, recurring units of the organic epoxide. Preferred organic epoxides include ethylene oxide, propylene oxide, butylene oxide, hexylene oxide, cyclohexene epoxide and styrene oxide, i.e., those having eight or fewer carbon atoms.

When a haloalkylmaleic anhydride or haloalkylmaleate ester is used as the terminating agent, the resulting terminal groups can be converted by hydrolysis to carboxyl groups. The resulting dicarboxylic polymer may be copolymerized with glycols or diamines to form polyesters and polyamides having a graft copolymer structure.

If it is desired to isolate and further purify the macromolecular monomer from the solvent from which it was prepared, any of the known techniques used by those skilled in the art in recovering polymeric materials may be used. These techniques include: (1) solvent-nonsolvent precipitation; (2) evaporation of solvent in an aqueous media; and (3) evaporation of solvent, such as by vacuum roll drying, spray drying freeze drying; and (4) steam jet coagulation.

The isolation and recovery of the macromolecular monomer is not a critical feature of the invention. In fact, the macromolecular monomer need not be recovered at all. Stated otherwise, the macromolecular monomer, once formed, can be charged with the suitable monomer and polymerization catalyst to conduct the graft copolymerization in the same system as the macromolecular monomer was prepared, providing the solvent and materials in the macromolecular monomer preparation reactor do not poison the catalyst or act in a deleterious manner to the graft copolymerization process. Thus, a judicious selection of the solvent and purification of the reactor system in the preparation of the macromolecular monomer can ultimately result in a large savings in the production of the graft copolymers of the present invention.

As pointed out above, the macromolecular monomers, which ultimately become the sidechains of the graft copolymers by being integrally polymerized into the backbone polymer, must have a narrow molecular weight distribution. Methods for determining the molecular weight distribution of polymers such as the macromolecular monomers are known in the art. Using these known methods, the weight average molecular weight ($\overline{M}w$) and the number average moleular weight ($\overline{M}n$) can be ascertained, and the molecular weight distribution ($\overline{M}w/\overline{M}n$) for the macromolecular monomer can be determined. The macromolecular monomers must have nearly a Poisson molecular weight distribution or be virtually monodisperse in order to have the highest degree of functionality. Preferably, the ratio of $\overline{M}w/\overline{M}n$ of the novel macromolecular monomers will be less than about 1.1. The macromolecular monomers of the present invention possess the aforementioned narrow molecular weight distribution and purity due to the method of their preparation, described hereinabove. Thus, it is important that the sequence of steps in preparing the macromolecular monomers be adhered to in order to produce the optimum results in beneficial properties in the graft copolymers.

GRAFT COPOLYMERIZATION

Prior to the invention herein, graft copolymers were prepared by synthesizing a linear "backbone," then grafting onto this backbone, growing polymeric or preformed polymeric chains. These methods generally require elaborate equipment and produce a mixture of products having inferior properties unless further purified. Because of the additional processing conditions and the use of special equipment, these processes are not economically feasible.

The graft copolymers of the present invention are prepared by first synthesizing the pendant polymeric chains (the polymerizable terminated living polymers) then copolymerizing the terminal portions of the polymeric chains with the second monomer during the formation of the backbone polymer.

In accordance with the practice of the present invention, the substantially pure macromolecular monomers of high controlled molecular weight and molecular weight distribution have an appropriate reactive end group suitable for any mechanism of copolymerization, e.g., free-radical, cationic, anionic, Ziegler catalysis, and condensation. Thus, the reactive end group is selected for easy copolymerization with low cost monomers by conventional means and within existing polymerization equipment.

The copolymerization with the macromolecular monomers and the second reactive monomer is a graftlike structure where the pendant chain is a polymer whose molecular weight and distribution are predetermined by independent synthesis. The distribution of the sidechain polymer along the backbone is controlled by the reactivity ratios of the comonomers.

Since the reactive end group of the macromolecular monomer is copolymerized with the second monomer, it is an integral part of the backbone polymer. Thus, the polymerizable end group of the macromolecular monomer is interposed between large segments of the backbone polymer.

Although some of the prior art graft copolymers, such as those described in U.S. Pat. Nos. 3,627,837, 3,634,548 and 3,644,584 and British Pat. Nos. 873,656 and 1,144,151 resemble the graft copolymers of the present invention. Generally, the present graft copolymers are different compositions, not only because they are prepared by significantly different processes, but because the pendant polymeric chains of the graft copolymers of this invention are of relatively uniform, minimum length, and are each an integral part of the backbone. Furthermore, the backbone of the graft copolymers of the present invention contain polymeric segments of certain minimum length. Thus, the present graft copolymers differ structurally because the macromolecular monomer is interposed between polymeric segments of the backbone polymer, rather than being merely attached to the backbone polymer in a random manner. These characteristics contribute materially to the advantageous properties which inhere in these novel graft copolymers.

The present invention provides a means for controlling the structure of the graft copolymer. More specifically, the control of the structure of the graft copolymer can be accomplished by any one or all of the following means: (1) by determining the reactivity ratio of the macromolecular monomer and a second monomer during the copolymerization reaction, a pure graft polymer free from contamination by homopolymers can be prepared; (2) by controlling the monomer addition rates during the copolymerization of a macromolecular monomer and a second monomer, the distance between the sidechains in the polymer structure can be controlled; and (3) the size of the graft chain can be predetermined and controlled in the anionic polymerization step of the preparation of the macromolecular monomer.

It will be apparent to those skilled in the art that by the proper selection of terminating agents, all mechanisms of copolymerization may be employed in preparing the controlled phase separated graft copolymers.

As previously stated, various different catalyst systems can be employed in the present invention for the copolymerization process. It will be apparent to those skilled in the art that the particular catalyst system used in the copolymerization will vary, depending on the monomer feed and the particular end group on the macromolecular monomer. For example, when using a macromolecular monomer having a vinyl acetate end group, best results are generally obtained by employing free-radical catalyst systems. On the other hand, copolymerization utilizing isobutylene monomer feed with either an allyl, methallyl or epoxy terminated macromolecular monomer, best results are accomplished by utilizing the cationic polymerization techniques. The free-radical catalyst systems may also be employed in the preparation of polyethylene backbone copolymers with alpha-olefin terminated macromolecular monomers of the present invention utilizing high pressures and utilizing techniques known to those skilled in the art.

One of the preferred systems of the present invention is in the use of the so-called coordination catalyst utilizing an alpha-olefin (including comonomers of alpha-olefins and dienes) monomer feed with an alpha-olefin terminated macromolecular monomer.

It will be understood by those skilled in the art that the solvent, reaction conditions and feed rate will be partially dependent upon the type of catalyst system utilized in the copolymerization process. One of the considerations, of course, will be that the macromolecular monomer be dissolved in the solvent system utilized. It is not necessary, however, for the monomer feed to be soluble in the solvent system. Generally, under these conditions during the formation of the copolymer, the graft copolymer will precipitate out of the solvent wherein it can be recovered by techniques known in the polymer art.

The temperature and pressure conditions during the copolymerization process will vary according to the type of catalyst system utilized. Thus, in the production of low density polyolefin backbones under free-radical conditions, extremely high pressures will be employed. On the other hand, the high density substantially linear polyolefin backbone polymers produced by the coordination type catalyst generally will be prepared under moderately low pressures.

When preparing graft copolymers having a polyolefin backbone of ethylene or propylene or copolymers of ethylene and propylene together with a macromolecular monomer, it is preferred to employ a coordination catalyst known in the art at the Ziegler catalyst and Natta catalysts (the latter being commonly used for polypropylene). That is, materials advanced by Professor Dr. Karl Ziegler of the Max Planck Institue of Mulheim, Ruhr, Germany, and Dr. Giulio Natta of Milan, Italy. Some of these catalysts are disclosed in Belgian Pat. No. 533,362, issued May 16, 1955, and U.S. Pat. Nos. 3,113,115 and 3,257,332 to Ziegler, et al. These catalysts are prepared by the interaction of a compound of transition metals of group IV-VIII in the periodic table, the catalyst, and an organometallic compound derived from group I–III metals, as cocatalyst. The latter are compounds such as metal hydrides and alkyls capable of giving rise to hydride ions or carbanions, such as trialkyl aluminum. Compounds of the transition elements have a structure with incomplete d-shells and in the lower valence states, can associate with the metal alkyls to form complexes with highly polarized bonds. Those elements hereinabove referred to as the catalysts are preferably titanium, chromium, vanadium, and zirconium. They yield the best Ziegler catalysts by reaction of their compounds with metal alkyls.

Compounds of these transitions metals in the higher valence stage, e.g., titanium tetrachloride, are reduced by the metal alkyls to a lower valence state. The resultant products containing the transition metal in the lower valence state, e.g., titanium dichloride, react directly with the metal alkyl to yield active catalysts possessing hydride ions or carbanions. If the reduction of the transition metal compound proceeds to the free metal, the resultant products are either suitable for catalysis of the displacement reaction e.g., nickel, cobalt, platinum, or an inactive polymerization catalyst.

Also included among the coordination catalysts contemplated for the copolymerization process of the present invention are those catalyst systems disclosed in the patents assigned to E. I. DuPont de Nemours and Company, i.e., British Pat. No. 778,639, issued July 10, 1957, French Pat. No. 1,134,740, issued Apr. 17, 1957, Belgian Pat. No. 554,475, issued Jan. 24, 1957, British Pat. No. 777,538, issued June 26, 1957, and French Pat. No. 1,135,808, issued May 3, 1957. These patents describe the appropriate catalyst as comprising a compound of one or more of the elements of titanium, zirconium, cerium, vanadium, niobium, tantalum, chromium, molybdenum or tungsten, wherein at least a part of the metal is present in a valence state of three or below and preferably two, or is associated with a sufficiently quantity of a reducing agent capable of reducing the valence state of the polyvalent metal to such a lower state. Suitable reducing agents include Grignard reagents, metal alkyls or aryls, zinc metal and metals above zinc in the electromotive series, and the metal hydrides.

As is well-known, the Ziegler catalysts which are effective for the polymerization of ethylene to linear, high density, high molecular weight polyethylene, and the stereospecific polymerization of other alpha-olefins to crystalline, stereoisomeric polymers are generally heterogeneous.

The various Ziegler catalysts referred to above are approximately equally capable of polymerizing either ehtylene, higher alpha-olefins, such as propylene, 1-butene, isobutylene, 1-pentene, 1-hexene, styrene, 3-methyl-1-butene and 4-methyl -1-hexene and conjugated diolefins such as butadiene and isoprene. They can also be used in the copolymerization of any of these monomers with ethylene and other alpha-olefins in conjunction with the macromolecular monomers of the present invention. The difference between the polymerization of ethylene and that of alpha-olefins lies in the possibility of attaining structural regularity in higher polyolefins.

Generally speaking, the production of the high density graft copolymers having olefin backbones will be conducted at pressures of from about 1 to about 1,000 psi, preferably from about 1 to 200 psi. The pressure may be increased by the use of nitrogen gas, if desired.

As previously stated, the solvent system utilized will most conveniently be the solvent employed in the preparation of the macromolecular monomer. Solvents useful for the polystyrene macromolecular monomers are those which dissolve polystyrene. Typical solvents for polystyrene include cyclohexane, benzene, toluene, xylene, decalin, tetralin, etc.

The copolymerization reaction may be conducted at any suitable temperature, depending on the particular catalyst, macromolecular monomer, monomer feed, resulting graft copolymer and solvent used. Generally, the graft copolymerization will be conducted at a temperature of from about 10°C to about 500°C, preferably from about 20°C to about 100°C.

The copolymerization reaction is preferably conducted by placing a predetermined amount of the macromolecular monomer dissolved in the appropriate solvent in the reactor. The polymerization catalyst and monomer are thereafter fed into the solvent system to produce the graft copolymer.

It is generally desirable to provide a graft copolymer having at least about 2 percent macromolecular monomer incorporated in the backbone polymeric material, however, satisfactory results can be obtained with up to about 40 percent by weight macromolecular monomer incorporation. Preferably, the graft copolymers of the present invention will have about 5 percent to about 20 percent by weight incorporation of the macromolecular monomer into the backbone polymeric material to obtain the optimum physical properties of both the sidechain polymer and the backbone polymer.

The means for providing the proper amount of incorporation of the macromolecular monomer can be determined simply by adding the appropriate weighed macromolecular monomer used in the copolymerization process. For example, if a graft copolymer having 10 percent by weight incorporation of the macromolecular monomer into the backbone polymer is desired, one simply employs 10 parts by weight of the macromolecular monomer for each 90 parts by weight of the monomer feed.

Following the procedures outlined above, graft copolymers having unique combinations of properties are produced. These unique combinations of properties are made possible by the novel process herein which forces the compatibility of otherwise incompatible polymeric segments. These incompatible segments segregate into phases of their own kind.

As it can be seen from the diagrammatic description in FIG. II, a controlled dispersion of the macromolecular sidechain occurs in one phase (domain) within the backbone polymer phase (matrix). Because all of the macromolecular sidechain domains are an integral part or interposed between large segments of the backbone polymer, the resulting graft copolymer will have the properties of a cross-linked polymer, if there is a large difference in the Tg or Tm of the backbone and sidechain segments. This is true only up to the temperature required to break the thermodynamic cross-link of the dispersed phase. In essence, a physically cross-linked (as opposed to chemical cross-linked) type polymer can be made that is reprocessable and whose properties are established by simple cooling, rather than vulcanization or chemical cross-linking.

The graft copolymers of the present invention are differentiated from the macroscropic opaque and weak blends of incompatible polymers of the prior art. The graft copolymers of this invention contain separate phases which are chemically joined and the dispersion of one segment into the matrix polymer is on a microscopic level and below the wavelength of light of the matrix polymer. The graft copolymers herein are, therefore, transparent, tough, and truly thermoplastic.

An illustrative example of the present invention includes combining the advantageous properties of polystyrene with the advantageous properties of polyethylene, although these two polymers normally are incompatible with one another and a mere physical mixture of these polymers has very little strength and is not useful. To combine these advantageous properties in one product, it is necessary that the different polymeric segments be present as relatively large segments. The properties of polystyrene do not beome apparent until the polymer consists essentially of at least about 20 recurring monomeric units. This same relationship applies to the polymeric segments present in the graft copolymers herein, i.e., if a graft copolymer comprising polystyrene segments is to be characterized by the advantageous properties of polystyrene, then those polystyrene segments must, individually, consist essentially of at least about 20 recurring monomeric units. This relationship between the physical properties of a polymeric segment in its minimum size is applicable to the polymeric segment of all graft copolymers herein. In general, the minimum size of a polymeric segment which is associated with the appearance of the physical properties of that polymer in the graft copolymers herein is that which consists of about 20 recurring monomeric units. Preferably, as noted earlier herein, the polymeric segments both of the copolymeric backbone and the sidechains, will consist essentially of more than about 30 recurring monomeric units.

The polymeric segments of the graft copolymers of the invention may themselves be homopolymeric or they may be copolymeric. Thus, a graft copolymer of this invention may be prepared by the copolymerization of ethylene, propylene, and a terminated polystyrene containing a polymerizable alpha-olefin end group. The uninterrupted polymeric segments of the backbone of such a graft polymer will be copolymeric segments of ethylene and propylene.

The graft copolymers comprising polymeric segments having fewer than about 20 recurring monomeric units are, nevertheless, useful for many applications, but the preferred graft copolymers are those in which the various polymeric segments have at least about 20 recurring monomeric units.

The placement of the sidechain in the polymer backbone is dependent on the terminal group of the macromolecular monomer and the reactivity of the comonomer.

The macromolecular monomers of the invention are stable in storage and do not significantly homopolymerize. Furthermore, the macromolecular monomer copolymerizes through the terminal double bond or reactive end group and is not incorporated into the polymeric backbone by grafting reactions to the polymer of the macromolecular monomer segment.

As indicated hereinabove, the macromolecular monomers of the invention copolymerize with commercial vinyl monomers in a predictable manner as determined by relative reactivity ratios. It can be shown that the instantaneous copolymer equation:

$$dM_1/dM_2 = [M_1/M_2][r_1 M_1/M_2 + 1/M_1M_2 + r_2] \quad (1)$$

simply reduces to the approximation:

$$dM_1/dM_2 \sim M_1/r_2 M_2 \quad (2)$$

when $M_1$ is in very low molar concentrations.

Thus, the macromolecular monomer ($M_1$) copolymerizations with other monomers ($M_2$) are described only by $r_2$ values and monomer feed compositions. Rearrangement of equation (2) gives:

$$r_2 = dM_2/M_2/dM_1/M_1 = \% \text{ Conversion } M_2/\% \text{ Conversion } M_1 \quad (3)$$

The reactivity ratio, $r_2$, can be estimated from a relatively low conversion sample of a single copolymerization experiment. The validity of this concept of a predictable and controllable reactivity of the macromolecular monomer can thereby be established. It has been shown that the reactivity of commercial monomers with the macromolecular monomers of the present invention with various end groups correlate with available literature values for reactivity ratios of $r_2$.

The method of the present invention permits the utilization of all types of polymerizable monomers for incorporation into backbone polymers, and makes it possible for the first time to design and build graft copolymers of controlled molecular structure, and of backbone and graft segments with different properties, such as hydrophobic and hydrophilic segments, crystalline and amorphous segments, polar and non-polar segments, segments with widely different glass transition temperatures, whereas prior work on SDS terblock copolymers had been limited to the incompatibility of glassy polystyrene blocks with rubbery polydiene blocks.

Although, as indicated, the graft copolymers herein are characterized by a wide variety of physical properties, depending on the particular monomers used in their preparation, and also on the molecular weights of the various polymer segments within a particular graft copolymer, all of these graft copolymers are useful, as a minimum, as tough, flexible, self-supporting films. These films may be used as food-wrapping material, painters' dropcloths, protective wrapping for merchandise displayed for sale, and the like.

Graft copolymers of the macromolecular monomer, polystyrene, with ethylene-propylene, isobutylene, or propylene oxide monomers have been found to be stable materials that behave like vulcanized rubbers, but are thermoplastic and reprocessable. Thus, an extremely tough, rubbery plastic is obtained without the inherent disadvantages of a vulcanized rubber. These copolymerized rubber-forming monomers with the macromolecular monomers of the present invention have the additional use as an alloying agent for dispersing additional rubber for impact plastics.

Just as metal properties are improved by alloying, so are polymer properties. By adding the appropriate amount of an incompatible material to a plastic in a microdispersed phase, over-all polymer properties are improved. A small amount of incompatible polybutadiene rubber correctly dispersed in polystyrene gives high impact polystyrene. The key to this microdispersion is a small amount of chemical graft copolymer that acts as a flux for incorporating the incompatible rubber.

In a similar manner, a copolymer of the macromolecular monomer of the present invention can be the flux for incorporating or dispersing incompatible polymers into new matrices making possible a whole new line of alloys, impact plastics, malleable plastics, easy-to-process plastics.

The use of the graft copolymers as alloying agents is particularly exemplified in the case of polyethylene-polystyrene blends. As it is well-known, polyethylene and polystyrene are incompatible when blended together. However, when using the graft copolymers of the present invention as an alloying agent, the polyethylene and polystyrene phases can be conveniently joined.

For example, a blend prepared by mixing 90 to 51 parts by weight of commercial polyethylene (either low or high density), 10 to 49 parts by weight of commercial polystyrene and 5 to 30 parts by weight of a graft copolymer of the present invention comprising polystyrene sidechains and a polyethylene backbone are useful in making automobile parts, such as inner door panels, kick panels, and bucket seat backs, or appliance parts such as television components. Such blends are also useful as structural foams, sheets and films, containers and lids in packaging, beverage cases, pails, in the manufacture of toys, molded sheets in furniture, hot mold adhesives and computer and magnetic tapes.

The use of the graft copolymers of the present invention as an alloying agent offers a distinct advantage over the prior art blends, inasmuch as the plastic blend can be processed with minimized phase separation of the polystyrene and polyethylene polymers in the blend. The strength of the novel blends of the present invention is also improved over the blends of the prior art.

If polystyrene in the macromolecular monomer is replaced by a poly(alpha-methylstyrene) and is copolymerized with ethylene, a similar polyblend can be prepared as described above. However, these blends will have heat stability which will allow the resulting plastics to be useful in making hot water pipes, sheets in warm areas, and automobile parts, having oxidative stability over rubber-containing materials. These plastics also have utility in preparing reinforced fiberglass and fillers due to their good adhesion to fiberglass. Polyblends of poly(alpha-methylstyrene) graft copolymer with large amounts, i.e., 51–90 percent by weight of poly(alpha-methylstyrene) and 10–49 polyethylene, exhibit a higher heat distortion, together with high impact strength and high modulus. These plastics are useful in various engineering applications and in the manufacture of parts for aircraft, auto bodies, recreational vehicles, appliances, gears, bearings, etc.

Another useful blend utilizing the graft copolymers of the present invention comprises mixing 10 to 49 parts of low density polyethylene, 51 to 91 parts by weight of poly(alpha-methylstyrene) and zero to 30 parts by weight of polystyrene and 5 to 30 parts by weight of the graft copolymer of the present invention comprising polyethylene backbone with poly(alpha-methylstyrene) or styrene sidechains. The blend is extruded in a mill and the resultant plastic is found useful in making appliances such as coffee makers, humidifiers, high intensity lamps, color television sets, kitchenrange hardware, blenders, mixers, and electric toothbrushes. These plastics are also useful in preparing recreational vehicles such as snowmobile parts and helmets; machine parts such as gears, bearings; plumbing parts such as shower heads, valves, fittings and ballcocks; and motor housing, stamping, lawn sprinklers, stereo tape or cartridges, etc.

The reinforcement of plastics by adding glass fibers or other materials is difficult to achieve because of poor wetting character of many basic polymers. The macromolecular monomers of the present invention, particularly those containing reactive polystyrene, have a tendency to wet and bond to glass with facility. By proper dispersion of glass in a macromolecular copolymer, it is possible to upgrade the bond between the dispersed phase and glass. Thus, the macromolecular graft copolymers of the present invention can also be used as reinforcing adhesion aids to glass fibers.

The invention is illustrated further by the following examples which, however, are not to be taken as limiting in any respect. In each case, all materials should be pure and care should be taken to keep the reacted mixtures dry and free of contaminants. All parts and percentages, unless expressly stated to be otherwise, are by weight.

PREPARATION OF MACROMOLECULAR MONOMER SIDECHAINS HAVING UNIFORM MOLECULAR WEIGHT

EXAMPLE 1 a. Preparation of Polystyrene Terminated With Allyl Chloride

A stainless steel reactor is charged with 76.56 parts of A.C.S. grade benzene (thiophene-free), which had been pre-dried by Linde molecular sieves and calcium hydride. The reactor is heated to 40°C and 0.015 parts of diphenylethylene is added to the reactor by means of a hypodermic syringe. A 12.1 percent solution of sec-butyl lithium in hexane is added to the reactor portionwise until the retention of a permanent orange-yellow color, at which point an additional 0.885 parts (1.67 moles) of sec-butyl lithium solution is added, followed by the addition of 22.7 parts (218 moles) of styrene over a period of 44 minutes. The reactor temperature is maintained at 36–42°C. The living polystyrene is terminated by the addition of 0.127 parts of allyl chloride to the reaction mixture. The resulting polymer is precipitated by the addition of the alpha-olefin terminated polystyrene-benzene solution into methanol, whereupon the polymer precipitates out of solution. The alpha-olefin terminated polystyrene is dried in an air circulating atmosphere drier at 40°–45°C and then in a fluidized bed to remove the trace amounts of methanol. The methanol content after purification is 10 parts per million. The molecular weight of the polymer, as determined by membrane phase osmometry, is 15,400 (theory: 13,400) and the molecular weight distribution is very narrow, i.e., the $\overline{M}w/\overline{M}n$ is less than 1.05. The macromolecular monomer has the following structural formula:

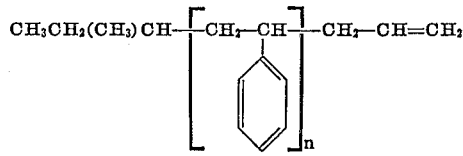

wherein $n$ has a value such that the molecular weight of the polymer is 15,400.

b. The procedure of Example 1(a) is repeated using, in place of allyl chloride, an equivalent amount of methallyl chloride to produce a methallyl terminated polystyrene.

c. The procedure of paragraph (a) is repeated using, in place of styrene, an equivalent amount of ethylene oxide to produce a crystalline polyoxyethylene living polymer. The living polymer is terminated by the addition of a molar equivalent amount of vinylbenzyl chloride to produce a polymer having the following structural formula:

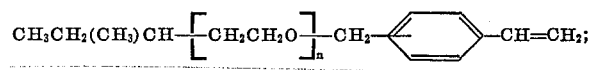

EXAMPLE 2 a. Preparation Of Poly(alpha-methylstyrene) Terminated With Allyl Chloride

A solution of 472 grams (4.0 moles) of alpha-methylstyrene in 2,500 ml. tetrahydrofuran is treated dropwise with a 12 percent solution of n-butyl lithium in hexane until the persistence of a light red color. An additional 30 ml. (0.0383 mole) of this n-butyl lithium solution is added, resulting in the development of a bright red color. The temperature of the mixture is then lowered to −80°C, and after 30 minutes at this temperature, 4.5 grams (0.06 mole) of allyl chloride is added. The red color disappears almost immediately, indicating termination of the living polymer. The resulting colorless solution is poured into methanol to precipitate the alpha-olefin terminated poly(alpha-methylstyrene) which is shown by vapor phase osmometry to have a number average molecular weight of 11,000 (theory: 12,300) and the molecular weight distribution is very narrow, i.e., the $\overline{M}w/\overline{M}n$ is less than 1.05. The macromolecular monomer produced has the following structural formula:

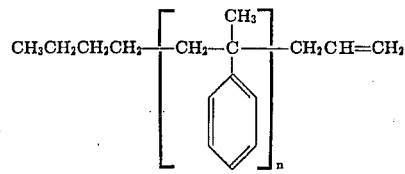

wherein $n$ has a value such that the molecular weight of the polymer is 11,000.

The procedure of paragraph (a) is repeated using, in place of n-butyl lithium, a solution of an equivalent amount of potassium t-butyl alkoxylate and in place of alpha-methylstyrene, an equivalent amount respectively of:

b. 4-vinyl pyridine, terminating with a molar equivalent of allyl chloride to produce a polymer having the following structural formula:

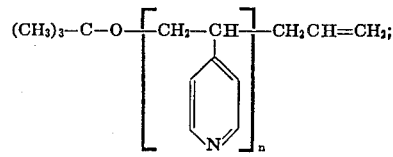

c. methacrylonitrile, terminating with a molar equivalent of vinylbenzyl chloride to produce a polymer having the following structural formula:

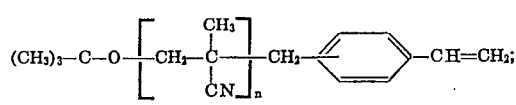

d. methyl methacrylate, terminating with p-vinylbenzyl chloride to produce a polymer having the following structural formula:

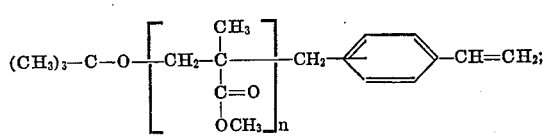

e. N,N-dimethylacrylamide, terminating with p-vinylbenzyl chloride to produce a polymer having the following structural formula:

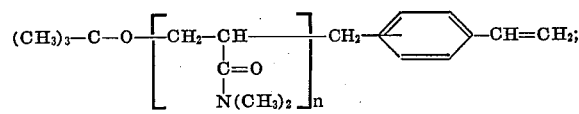

and

EXAMPLE 3

Preparation Of Polystyrene Terminated With Vinyl Chloroacetate

A solution of one drop of diphenyl ethylene in 2,500 ml. of cyclohexane at 40°C is treated portionwise with a 12 percent solution of sec-butyl lithium in cyclohexane until the persistance of a light red color, at which point an additional 18 ml. (0.024 mole) of the sec-butyl lithium is added, followed by 312 grams (3.0 moles) of styrene. The temperature of the polymerization mixture is maintained at 40°C for 30 minutes, whereupon the living polystyrene is capped by treatment with 8 ml. (0.040 mole) of diphenyl ethylene, then terminated by treatment with 6 ml. (0.05 mole) of vinyl chloroacetate. The resulting polymer is precipitated by addition of the cyclohexane solution to methanol and the polymer is separated by filtration. Its number average molecular weight, as determined by vapor phase osmometry, is 12,000 (theory: 13,265), and the molecular weight distribution is very narrow, i.e., the $\overline{Mw}/\overline{Mn}$ is less than 1.06. The macromolecular monomer produced has the following structural formula:

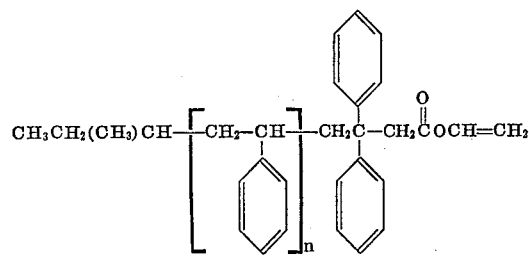

wherein $n$ has a value such that the molecular weight of the polymer is 12,000.

EXAMPLE 4

Preparation Of Poly(alpha-methylstyrene) Terminated With Vinyl Chloroacetate

A solution of 357 grams (3.0 moles) of alpha-methylstyrene in 2,500 ml. of tetrahydrofuran is treated dropwise with a 12 percent solution of t-butyl lithium in pentane until the persistence of a light red color. Thereupon, an additional 15.0 ml. (0.03 mole) of the t-butyl solution is added, resulting in the development of a bright red color. The temperature of the mixture is then lowered to −80°C, and after 30 minutes at that temperature, 5.6 ml. of diphenyl ethylene is added. The resulting mixture is poured into 5.0 ml. (0.04 mole) of vinyl chloroacetate and the thus-terminated poly(alpha-methylstyrene) is precipitated with methanol and separated by filtration. Its number average molecular weight, as determined by vapor phase osmometry, is 14,280 (theory: 12,065) and the molecular weight distribution is very narrow. The macromolecular monomer produced has the following structural formula:

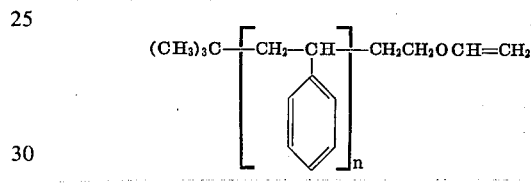

wherein $n$ has a value such that the molecular weight of the polymer is 14,280.

EXAMPLE 5

Preparation Of Polystyrene Terminated With Vinyl-2-Chloroethyl Ether

A solution of one drop of diphenyl ethylene at 40°C is treated portionwise with a 12 percent solution of t-butyl lithium in pentane until the persistence of a light red color, at which point an additional 30 ml. (0.04 mole) of the t-butyl lithium solution is added, followed by 312 grams (3.0 moles) of styrene. The temperature of the polymerization mixture is maintained at 40°C for 30 minutes, whereupon the living polystyrene is terminated by treatment with 8 ml. (0.08 mole) of vinyl-2-chloroethyl ether. The resulting polymer is precipitated by addition of the benzene solution to methanol and the polymer is separated by filtration. Its number average molecular weight, as determined by vapor phase osmometry, is 7,200 (theory: 7,870) and the molecular weight distribution is very narrow, i.e., the $\overline{Mw}/\overline{Mn}$ is less than 1.06. The macromolecular monomer produced has the following structural formula:
wherein $n$ has a value such that the molecular weight of the polymer is 7,200.

EXAMPLE 6

Preparation Of Polystyrene Terminated With Epichlorohydrin

A benzene solution of living polystyrene is prepared in Example 5 and terminated by treatment with 10 grams (0.10 mole) of epichlorohydrin. The resulting terminated polystyrene is precipitated with methanol and separated by filtration. Its molecular weight, as shown by vapor phase osmometry, is 8,660 (theory: 7,757) and its number average molecular weight distribution is very narrow. The macromolecular monomer produced has the following structural formula:

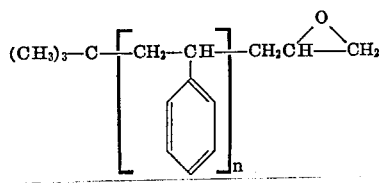

wherein n has a value such that the molecular weight of the polymer is 8,660.

EXAMPLE 7 a. Preparation Of Polystyrene Terminated With Methacrylyl Chloride

A solution of 0.2 ml. of diphenyl ethylene is 2,500 ml. of benzene there is added dropwise a 12 percent solution of n-butyl lithium in hexane until the persistence of a light reddish-brown color. An additional 24 ml. (0.031 mole) of this n-butyl lithium solution is added, and then, 416 grams (4.0 moles) of styrene, resulting in the development of an orange color. A temperature of 40°C is maintained throughout by external cooling and by controlling the rate at which the styrene is added. This temperature is maintained for an additional 30 minutes after all of the styrene has been added, and then is lowered to 20°C, whereupon 4.4 grams (0.1 mole) of ethylene oxide is added, causing the solution to become colorless. The living polymer is terminated by reaction with 10 ml. (0.1 mole) of methacrylyl chloride. The resulting polymer has a number average molecular weight as shown by vapor phase osmometry of 10,000. The macromolecular monomer has the following structural formula:

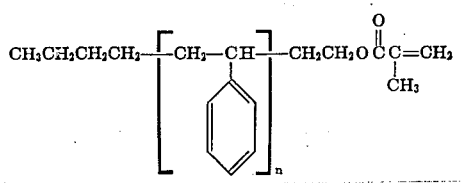

wherein n has a value such that the molecular weight of the polymer is 10,000.

b. Acrylyl chloride is substituted for methacrylyl chloride in the above procedure to give an acrylic acid ester end group on the polystyrene chain.

c. Allyl chloride is substituted for methacrylyl chloride in procedure (a) to produce an allyl ether terminated polystyrene.

d. Methallyl chloride is substituted for methacrylyl chloride in procedure (a) to produce methallyl ether terminated polystyrene.

e. Maleic anhydride is substituted for methacrylyl chloride in procedure (a), followed by protonation with water to produce polystyrene terminated with the half ester of maleic acid.

f. Epichlorohydrin is substituted for methacrylyl chloride to produce an epoxy ether terminated polystyrene.

g. The procedure of (a) is repeated using in place of styrene, an equivalent amount of isoprene and in place of n-butyl lithium an equivalent amount of sec-butyl lithium to produce primarily a rubbery cis-1,4-polyisoprene. The low Tg living polymer is terminated by the addition of a molar equivalent, based on sec-butyl lithium, ethylene oxide as a capping agent, followed by a molar equivalent amount of allyl chloride to produce a polymer predominantly having the following structural formula:

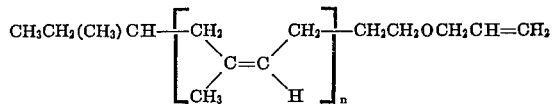

PREPARATION OF GRAFT COPOLYMERS HAVING MACROMOLECULAR MONOMERS INTEGRALLY POLYMERIZED INTO THE BACKBONE

EXAMPLE 8

Preparation Of Graft Copolymer From Poly(alpha-methylstyrene) Macromolecular Monomer Terminated With Allyl Chloride And Ethylene A solution of 20 grams of poly(alpha-methylstyrene) macromolecular monomer terminated with allyl chloride and having an average molecular weight of 10,000 prepared as in Example 2(a) in 100 ml. of cyclohexane is prepared and treated with 5.5 ml. of 0.645 M (9.1 percent solution) diethyl aluminum chloride in hexane and 2 ml. of vanadium oxytrichloride, then pressured with ethylene to 30 psig. This sytem is agitated gently for about 1 hour at 30°C, whereupon a polymeric material precipitates from the solution. It is recovered by filtration and pressed into a thin transparent film which is tough and flexible.

EXAMPLE 9 a. Preparation Of Graft Copolymer Having A Polyethylene Backbone And Polystyrene Sidechains One gram of the alpha-olefin terminated polystyrene of uniform molecular weight prepared in Example 1(a) is dissolved in 1,500 ml. of cyclohexane and charged into a 2-liter "Chemco" reactor. The reactor is purged with prepurified nitrogen for 30 minutes, and 22 ml. of 25 percent ethylaluminum sesquichloride solution (in heptane) is added. The reaction is pressured to 40 psi with 20 grams of ethylene into the solution. Thereafter, 0.1 ml. of vanadium oxytrichloride is added and the ethylene pressure drops from 40 psi to 1 psi in about 1 minute. The reaction is terminated in 3 minutes by the addition of isopropanol. The polymer is recovered by filtration and slurried with cyclohexane and then with isopropanol. The yield is 18.0 grams of a fluffy, white copolymer having a macromolecular monomer sidechain content of 5.8 percent, as determined by I.R. Extraction and analysis of the extracts indicate all of the macromolecular monomer and 17.0 grams of the ethylene copolymerized.

b. The procedure in Example 8(a) is repeated, except that 2.0 grams of the macromolecular monomer is used instead of 1.0 gram. The yield of the copolymer is 20.5 grams and the macromolecular monomer sidechain content, as determined by I.R., is 10 percent.

EXAMPLE 10 a. Preparation Of Graft Copolymer Having A Polyethylene Backbone And Polystyrene Sidechains A 2-liter "Chemco" reactor is charged with 1,500 ml. of purified cyclohexane. 20 grams of alpha-olefin terminated polystyrene prepared in Example 1(a) is added and dissolved in the purified cyclohexane. The reactor is thereafter purged with prepurified nitrogen for one hour with concurrent slow agitation. Ethylene is added to the reactor at the rate of 5 liters per minute to a pressure of 5 psi. The contents of the reactor is heated and controlled at 25°C, and high speed stirring is started; ethylaluminum sesquichloride (22.8 ml., 25 percent in heptane) catalyst is injected into the reactor by a hypodermic syringe, followed by the addition of 0.1 ml. of vanadium oxytrichloride. Polymerization begins immediately and the ethylene pressure in the reactor drops to nearly zero in about a minute. At this point, the ethylene rate is reduced to 0.5 liter per minute, and cooling is used to maintain a temperature of 25°C. At the end of 1 hour, a total of 43 grams of ethylene has been charged into the reactor, and the reactor is full of a fluffy polymer slurry. The reaction is stopped by the addition of 50 ml. of isopropanol to inactivate the catalyst.

The polymer is recovered by filtration, slurried and boiled in 1.5 liters of benzene for 1 hour, then refiltered to remove all the unreacted alpha-olefin terminated polystyrene from the copolymer. The polymer is then slurried in 1.5 liters of isopropanol and 0.03 gram of Irganox 1,010 anti-oxidant is added and then filtered and dried in a vacuum oven at 50°C. The yield is 49 grams of a fluffy, white copolymer having an alpha-olefin terminated polystyrene content of 16 percent, as determined by I.R. of a pressed film.

b. Preparation Of Graft Copolymer Having A Polyethylene Backbone And Poly(alpha-methylstyrene) Sidechains The macromolecular monomer used to produce the sidechains is first prepared by repeating the procedure described in Example 2(a), except that in place of the n-butyl lithium, 14 ml. (0.0,178 mole) of sec-butyl lithium (12 percent solution in heptane) is used as the initiator. The number average molecular weight, as determined by gel permeation chromotography, is 26,000 (theory: 26,500) and the molecular weight distribution is very narrow, i.e., the $\overline{M_w}/\overline{M_n}$ is less than 1.05.

Four liters of cyclohexane (Phillips polymerization grade) and 200 grams of the alpha-olefin terminated poly(alpha-methylstyrene) macromolecular monomer produced as described above are charged into a "Chemco" reactor. The mixture is heated to 70°C with concurrent stirring to dissolve the macromolecular monomer. The reactor is purged with high purity nitrogen for 1 hour with stirring. Ethylene gas is introduced into the reactor to a pressure of 5 psi, followed by 228 ml. of ethylaluminum sesquichloride (25 percent in heptane) and 1.0 ml. vanadium oxytrichloride. Agitation is increased and polymerization begins immediately, as noted by the pressure in the reactor dropping to nearly zero. The ethylene flow rate is adjusted to 5 liters per minute, and the internal temperature is controlled at 70°C. At the end of 1 hour, the reaction is terminated by the addition of 500 ml. of isopropanol to inactivate the catalyst.

The polymer is isolated by centrifugation, slurried with benzene for 1 hour, and recentrifuged. The copolymer is then slurried in 5 liters of methanol and 0.3 gram of Irganox 1010 for 1 hour, centrifuged and dried in an oven at 50°C. The yield is 260 grams having an alpha-olefin terminated poly(alpha-methylstyrene) content of 22 percent, as determined by I.R. analysis of a pressed film.

EXAMPLE 11

Preparation Of Graft Copolymer Having An Ethylene-Propylene Copolymeric Backbone And Polystyrene Sidechains A 2-liter "Chemco" reactor is charged with 1½ liters of dry benzene and 50 grams of poly(alpha-methylstyrene) terminated with allyl chloride (as prepared in Example 2). The macromolecular monomer is dissolved by stirring and thereafter purged with nitrogen. The reactor is then charged with ethylene and propylene gases at the rate of 200 ml./minute and 800 ml./minute, respectively, to build-up 10 psi pressure in the reactor. While maintaining a reaction temperature of 25°–35°C, 2 ml. of vanadium oxytrichloride and 4 ml. of ethylaluminum sesquichloride solution (25 percent in heptane) are added to the reaction mixture by means of syringe to initiate polymerization. As the polymerization is started, additional macromolecular monomer (335 ml. of 10 percent macromolecular solution) is added in solution form, i.e., 70 grams of the macromolecular monomer is dissolved in 630 ml. of dry benzene, and pumped in by Micro-Bellow-pump. During the reaction, the flow rate of the gases are checked constantly to insure that the ethylene and propylene feed rate are at the same initial level. Additional catalyst, $Et_3 Al_2 Cl_3$ (27 ml. in 25 percent heptane) and $VOCl_3$ (1.8 ml.) is added by syringe during the reaction, as the rate of polymerization slowed down, which is observed by a build-up of the internal pressure in the reactor. After 1 hour, the polymerization is terminated by the addition of 20 ml. of isopropyl alcohol. The product is precipitated in methanol and 51 grams of a white, rubbery polymer is obtained.

EXAMPLE 12

Preparation Of Graft Copolymer Having Ethylene-Propylene Copolymeric Backbone And Polystyrene Sidechains A 1-gallon "Chemco" reactor is charged with 3 liters of dried cyclohexane and 10 grams of polystyrene terminated with allyl chloride (as prepared in Example 1). The solution is purged with nitrogen for 30 minutes. 20 ml. of tri-n-hexylaluminum (25 percent) solution is added, followed by the addition of 139.5 grams of propylene to obtain a pressure of 26 psi and 20.4 grams of ethylene to obtain a pressure of 48 psi. Finally, there is added 0.2 ml. of vanadium oxytrichloride and a drop in pressure is observed. The polymerization is terminated after 10 minutes by the addition of 10 ml. of isopropanol.

The terpolymer solution is added slowly, with stirring, to a 4-liter beaker containing methanol to coagulate the polymer. The polymer which separated is air dried overnight. To remove the trace of catalyst residue, the gray colored polymer is dissolved in 500 ml. of cyclohexane and placed in a 2-liter resin flask, together with 1 liter of distilled water containing 0.1 gram of NaOH, and refluxed at 80°C for 2 hours. The contents are transferred into a 2-liter separatory funnel, and the bottom water layer is drained. The upper cyclohexane layer is added to methanol slowly, with stirring, to coagulate the polymer. The recovered polymer is dried in a vacuum oven. The unreacted macromolecular monomer is removed from the dried polymer by first dissolving in cyclohexane and adding dropwise to methyl ethyl ketone, with stirring. The terpolymer which is insoluble in methyl ethyl ketone is filtered and dried in a vacuum oven, and a yield of 52 grams is obtained. The terpolymer has improved tensile strength compared to ethylene-propylene copolymers prepared in the same manner without the macromolecular monomer.

EXAMPLE 13

Preparation Of Graft Copolymer Having Polyisoprene Backbone And Polystyrene Sidechains 500 ml. of dried cyclohexane is charged into a reactor, followed by the addition of 100 ml. (68 grams) of freshly distilled isoprene (Phillips polymerization grade), together with 17 grams of polystyrene terminated with allyl chloride (as prepared in Example 1). The reactor is sealed, followed by the addition of 2.5 ml. of tri-n-hexylaluminum solution (25 percent in heptane) and 0.16 ml. of titanium tetrachloride with hypodermic syringes. The reactor is agitated at 55°C for 16 hours, whereupon the contents of the reactor are slowly poured, with stirring, into a 4-liter beaker containing 2 liters of a 1 percent solution of Ionol antioxidant in isopropanol. A tough, rubbery, copolymer is obtained.

EXAMPLE 14

Preparation Of Graft Copolymer Having A Polystyrene Backbone And Polyoxyethylene Sidechains Equal parts of the polyoxyethylene terminated with vinylbenzyl chloride prepared in Example 1(c) and styrene monomer are placed in a reactor containing 1,000 ml. of benzene. The reactor is heated is 60°C and one part by weight of azobisisobutyronitrile free-radical polymerization catalyst is added. The polymerization is complete in 3 hours, obtaining a graft copolymer having hydrophilic-hydrophobic properties. The graft copolymer also reduces hydrostatic charges and is an alloying agent for polystyrene and polyoxyethylene.

EXAMPLE 15

Preparation Of Graft Copolymer Having A Polypropylene Backbone And Cis-1,4-Polyisoprene Sidechains A 1-gallon "Chemco" reactor is charged with 3 liters of heptane and 10 grams of allyl ether terminated cis-1,4-polyisoprene (as prepared in Example 7(g)). The macromolecular monomer is dissolved by stirring and thereafter the solution is purged with nitrogen for 30 minutes. 10 ml. of diethylaluminum chloride (25 percent solution in heptane) is added, followed by the addition of 0.3 gram of $TiCl_3$. 139.5 grams of propylene is added to obtain a pressure of 26 psi. The reactor is heated to 60°C, and polymerization is terminated after 18 hours, whereupon the contents of the reactor are slowly poured, with stirring, into a 4-liter beaker containing 2 liters of 1 percent solution of Ionol antioxidant in isopropanol. The graft copolymer has higher impact properties than polypropylene homopolymer.

EXAMPLE 16

Preparation Of Graft Copolymer Having Polyisobutylene Backbone And Polystyrene Sidechains To a solution of 20 grams of polystyrene macromer terminated with epichlorohydrin and having an average molecular weight of 10,000 in 1,000 ml. of toluene at −70°C, there is added 80 grams of isobutylene. 45 Ml. of boron trichloride ethyl ether complex is added slowly, the temperature being maintained at −70°C throughout. Polymerization occurs as the catalyst is added and is complete almost immediately after all of the catalyst has been added. The resulting graft copolymer is obtained by evaporating away the toluene and washing the residual solid with methanol.

EXAMPLE 17

Preparation Of Graft Copolymer Having Polyisobutylene Backbone And Polystyrene Sidechains To 1,000 ml. of methyl chloride at −70°C there is added 10 grams of polystyrene macromer terminated with epichlorohydrin, having an average molecular weight of 10,000. To this resulting solution maintained at −70°C, there is added concurrently and dropwise, a solution of 2 grams of aluminum chloride in 400 ml. of methyl chloride and 90 grams of isobutylene. The time required for these additions is 1 hour and at the end of this time polymerization is substantially complete. The resulting insoluble graft copolymer is isolated by evaporation of the methylene chloride. Similar results are obtainable by employing either a methallyl or methacrylyl end group on the polystyrene such as the product prepared in Examples 1(b), 7(a) and 7(d).

EXAMPLE 18 a. Preparation Of Polystyrene Macromolecular Monomer, Capped With Butadiene And Terminated With Allyl Chloride 2.5 liters of benzene (thiophene-free) are charged into the reactor and heated to 40°C. 0.2 ml. of diphenyl ethylene is added as an indicator and the reactor is sterilized with dropwise addition of a 12 percent solution of sec-butyl lithium until the persistence of an orange-red color. At this point, an additional 18 ml. (0.024 mole) of sec-butyl lithium solution (12 percent in hexane) is added, followed by 416 grams (4.0 moles) of styrene. The temperature of the polymerization mixture is maintained at 40°C for 5 minutes. Then the living polystyrene is capped with butadiene by bubbling butadiene gas into the reactor until the color of the solution changes from dark red to orange. The living polymer is terminated by treatment with 4.1 ml. (0.05 mole) of allyl chloride. The macromolecular monomer thus prepared is precipitated with methanol and separated by filtration. Its number average molecular weight estimated from gel permeation chromatography is 25,000 (theory: 18,000) and molecular weight distribution is very narrow. The macromolecular monomer produced has the following structural formula:

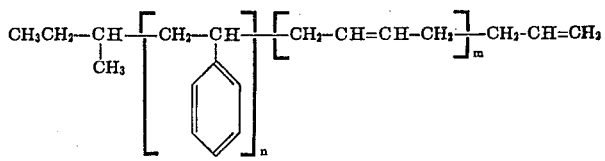

where $m$ equals 1 or 2.

b. Preparation Of Graft Copolymer Having A Polyethylene Backbone And Polystyrene Sidechains 2 grams of butadiene capped, alpha-olefin terminated polystyrene macromolecular monomer as prepared in Example 18(a) above, is dissolved in 1,500 ml. of cyclohexane and charged into a 2-liter "Chemco" reactor. The reactor is purged with prepurified nitrogen for 30 minutes, and 22 ml. of 25 percent ethylaluminum sesquichloride solution (in heptane) is added. The reactor is pressurized with 21 grams of ethylene to 40 psi. Thereafter, 0.1 ml. of vanadium oxytrichloride is added and ethylene pressure is dropped from 40 psi to 1 psi in about 1 minute. The reactor is terminated in 3 minutes by the addition of isopropanol. The polymer is recovered by filtration.

It is known that the physical properties of linear high density polyethylene are dependent on its extent of crystallinity, molecular weight and molecular weight distribution. It is a balance of these characteristics that generally governs the end use properties of fabricated items. The graft copolymers of the present invention, particularly those having a polyethylene backbone and polystyrene sidechains, modifies the physical properties of polyethylene without affecting the beneficial crystalline properties of polyethylene.

In order to demonstrate these beneficial properties of the graft copolymers, as well as the crystalline nature of the copolymers, several tests were conducted. The following data illustrates the properties of graft copolymers having a polyethylene backbone and polystyrene sidechains prepared by the procedure described in Examples 9 and 10.

DETERMINATION OF MACROMOLECULAR MONOMER CONTENT BY I.R. SPECTROSCOPY

Calibration curve of ethylene/polystyrene macromolecular monomer copolymer.

Commercial high density polyethylene, U.S.I. Microthene ML 708 and Dow polystyrene, Styron 666μ are blended in the ratios: 80/20, 70/30, 60/40, and 50/50, and extruded twice through a Killion extruder. The extruded blends are pressed into thin films (about 1 mil) and the infrared spectrum run on a Beckman I.R. 12 infrared spectrophotometer. The benzene ring absorbance at 710 cm$^{-1}$, and the methylene absorbance at 1,480 cm$^{-1}$ are measured and the ratios calculated. The calibration curve is drawn by plotting absorbance ratio vs. percent styrene as shown in FIG. III.

DETERMINATION OF MACROMOLECULAR MONOMER CONTENT OF COPOLYMERS

Ethylene-macromolecular monomer copolymers are pressed into thin films and their I.R. spectrum obtained on the Beckman I.R. 12 spectrophotometer. The absorbance at 710 cm$^{-1}$ for polystyrenemacromolecular monomer is compared to absorbance at 1,480 cm$^{-1}$, and the macromolecular monomer is determined from the calibration curve in FIG. III. FIG. IV illustrates the I.R. spectra for a graft copolymer having a polyethylene backbone and polystyrene sidechains (M.W. 27,000) having 20 percent by weight incorporation.

SAMPLE PREPARATION AND TESTING

The copolymers are compression molded into sheets of about 20 mil thickness for stress-strain testing. The mold is two 7 × 7 × 0.040 inch steel plates separated by a 7 × 7 × 0.020 inch steel shim cut out to make a 5 × 5 × 0.020 inch center cavity. Surfaces are coated with Dow Corning R–671 Resin as a mold release.

Approximately 8 grams of polymer are placed in the mold, and molded at 400°F for 10 minutes at 30 tons pressure, and cooled down by circulating water.

Three test specimens are cut out of the sheet with a dumbbell "C" die (ASTM D412–67T) and dimensions are measured by a micrometer.

Tensile properties are obtained on an Instron Tester according to ASTM D638 at a cross head speed of 2 inches/minute.

Flexual modulus of the copolymers is obtained on bars with Instron Tester according to ASTM D790.

Heat deflection is obtained on bars according to ASTM D640.

CRYSTALLINE STRUCTURE OF GRAFT COPOLYMER OF POLYETHYLENE BACKBONE AND MACROMOLECULAR MONOMER SIDECHAINS

The crystalline nature of copolymers having polyethylene backbones is studied from:
Crystallinity — X-ray diffraction;
Melting behavior — Differential Scanning Calorimetry;
Crystallite orientation — X-ray diffraction; and
Spherulite formation — Light microscopy.

CRYSTALLINITY

The measurement of crystallinity by X-ray diffraction takes many forms but an effective simple method is to calculate a crystallinity index (CrI) as follows:

$$CrI = I_{110} - I_{am}/I_{110} \times 100$$

where $I_{110}$ is the intensity, above background scattering, of the 110 diffraction peak taken at 21.6° 2θ. $I_{am}$ is the amorphous scattering at 19.8° 2θ.

For polyethylene, the separation of the X-ray scattering ascribed to the crystalline and amorphous fractions is simplified, since the amorphous peak is clearly distinguished from the crystalline peaks on diffraction patterns. FIG. V is a diffractometer tracing of a polyethylene with 12 percent integrally copolymerized alpha-olefin terminated polystyrene showing the separation of the two fractions and the measurement of peak heights. When used on published diffraction patterns of polyethylene, the method gives crystallinity values in accord with those in which the authors used integrated intensity measurements for the respective crystalline and amorphous material.

CrI values of several polyethylenes ranged from 72–77. The CrI of polyethylene decreases for copolymers in proportion to macromolecular monomer content (6–30 percent), as shown in FIG. VI. It is significant, that within experimental error, CrI values are not lower than those expected by a simple dilution of the polyethylene crystallinity with an amorphous macromolecular monomer.

The diffractometer tracings used for the CrI measurements (FIG. V) are also inspected for crystal lattice changes and for diffraction line-broadening with macromolecular monomer addition. Changes in the crystal lattice are not observed, which means that the macromolecular monomer is not incorporated into the polyethylene crystal lattice, but rather in the amorphous regions of the sample. Measured half-widths of the 200 diffraction peak shows no decrease in crystallite size with macromolecular monomer addition. Thus, diffractometer tracings, such as the one with 12 percent macromolecular copolymer, (FIG. V) and the graph of CrI versus macromer content (FIG. VI) demonstrate a significant feature of the invention; namely,

MELTING BEHAVIOR OF MACROMOLECULAR MONOMER-POLYETHYLENE COPOLYMERS

A differential scanning calorimeter (DSC) is used to determine the melting behavior of the copolymers and to seek confirmation of the lack of interference by macromolecular monomers with polyethylene crystallites. FIG. VII is a typical endothermic DSC trace of a copolymer melting under a programmed temperature rise. The macromolecular monomer is an alpha-olefin terminated polystyrene having a molecular weight of 27,000. The copolymer has 20 percent of the macromolecular monomer integrally copolymerized into the polyethylene backbone polymer. The melting behavior of the copolymer closely matches literature data for unmodified high-density polyethylene, even though the sample contains 20 percent of the macromolecular monomer. Undue premelting, for example, does not occur in copolymers and the melting point ($T_m$) is the same for both 100 percent polyethylene and copolymer samples. Also, on the basis of comparable polyethylenes made without macromolecular monomers using the same polymerization, the initial lift-off temperature (89°C) averaged 7°C higher for macromolecular monomer procedures containing samples. In one sample, the temperature increase is 19°C over the base polyethylene.

Crystallinity measurements are calculated from heat of fusion ($\Delta H$) data obtained from the area under the DSC trace. The calculations are based on an $\Delta H$ of 68.4 cal/g. for 100 percent crystalline polyethylene. Although at a different level, the crystallinity values by this method generally paralleled those obtained by X-ray.

The thermal data on melting and crystallinity thus confirms the X-ray data that the integrity of the polyethylene crystallites is maintained in the copolymer of the present invention. The reverse effect is generally observed, however, in polyethylene copolymers of the prior art or in polyethylene with sidechains simply attached to the polyethylene. Often in these instances, crystallinity not only decreases by more than a simple dilution factor, but also the polyethylene crystallites may show low values for $T_m$ and $\Delta H$.

CRYSTALLITE ORIENTATION

X-ray diffraction patterns were taken of stretched Instron test samples to determine crystallite orientation and the effect of macromolecular monomer addition on the ability of the crystallites to orient. The degree of orientation is determined from the size of the angle subtended by the arcs of the 110 and 200 diffraction peaks that are shown by oriented samples. Commercial high density polyethylene, unstretched and stretched (500 percent) are shown in FIGS. VIII(a) and (b) for comparison with a graft copolymer of a polyethylene backbone having 20 percent by weight incorporation of polystyrene sidechains, stretched, 800 percent (FIG. VIII(c) ). A stretched homopolymer (FIG. VIII(b)) shows a small 110 arc that subtends an angle of 17°, whereas the angle for the copolymer is 48° even though it is stretched more than the homopolymer. Hence, the macromolecular monomer phase acts within the amorphous regions to tie and hold the crystallite together at high elongations.

In molded films, on the other hand, a somewhat opposite effect is noted since copolymers show higher degrees of crystal plane orientation than homopolymers. The ratio of the 110 peak over the 200 peak height (FIG. V) is used in these instances. When the ratio of peak intensities is in the order of 3.3, the polyethylene sample is considered to have random orientation. For homopolymer polyethylenes, we prepared and tested the 110/200 peak ratio varied from 3.0 to 4.6. The orientation ratio for copolymers varied from about 3 to as high as 7.3 for samples mounted in the diffractometer with their film surface parallel to the sample holder. Molded specimens responded in an opposite sense, however, upon subsequent heating and cooling but without the pressure used during molding. Under these circumstances, a copolymer decreased from 7.3 to 4.8 while the base polyethylene increased from 4.6 to 5.0 in orientation. Similar changes are shown in other samples. These observations on changes in orientation further illustrate differences in polyethylene properties due to the presence of macromolecular monomers integrally copolymerized into the polyethylene backbone.

SPHERULITE FORMATION

Spherulitic structures are noted by microscopic examination in several of the polyethylene or ethylene-macromolecular monomer copolymers prepared. In molded samples, large (10–30 μm) spherulites in some of the 100 percent polyethylene specimens are observed to decrease in size and in optical perfection with macromolecular monomer addition (FIGS. IX(a) and (b)). This behavior is confirmed by crystallization from solvent (Tetrahydronaphthalene) where large and individually spearated spherulitic units can be observed as shown in FIGS. X(a) – (d). Polarized light is used and pictures are taken of spherulites from a homopolymer and copolymers with 6, 8 and 20 percent macromolecular styrene contents. The majority of the spherulites obtained from the copolymers are smaller and show more imperfections in structure than those obtained from the homopolymer. Similar effects as those shown in FIGS. IX and X are assumed to taken place in samples where spherulitic structures are on the order of 1.0 to 3.0 μm in diameter but where it is difficult to clearly distinguish changes in structure.

To demonstrate that the observed effects are a function of copolymerization, pictures were taken of crystals from THN that were obtained from physical blends with 5, 10 and 20 percent levels of macromolecular monomer. The spherulitic structures of the blends were unchanged from the homopolymer as shown in FIGS. XI(a) – (d).

Thus, a second feature of graft copolymers of the invention is evident in that while the polyethylene crystallites themselves are not impaired, the macromolecular monomer molecules interfere with the aggregation of crystallites into larger morphological units such as spherulites. Their action fits the pattern of being in the amorphous region of the sample and interferring with crystallite aggregation but contributing as tie molecules to film strength and elongation.

The interference with spherulite formation is also postulated as contributing towards materials with improved stress-cracking and low temperature flexibility properties.

A number of graft copolymers having polyethylene backbones and polystyrene sidechains are prepared using the procedure set forth in Examples 9 and 10. Also, a number of polyethylene homopolymers are prepared in the same manner as described for the copolymers, except for the omission of the macromolecular monomer. Chain transfer agents are not used to control molecular weight. Products obtained with continuous ethylene addition have broad molecular weight distributions, whereas those obtained by batch polymerizations have narrow molecular weight distributions.

The graft copolymers and the homopolymers of polyethylene are pressed into films, whereby they are each subjected to tests to determine yield strength, elongation, tensile strength, flex modulus, and other properties hereinafter set forth (using methods outlined above) to demonstrate the improved properties of the graft copolymers over the homopolymer of polyethylene. The results of these tests are summarized in Tables I – III below.

TABLE I

PROPERTIES OF POLYETHYLENE HOMOPOLYMERS

| Example | $\bar{M}n^a$ ×($10^3$) | $\bar{M}w^a$ ×($10^3$) | P.D.$^a$ | Yield Str.$^b$ (psi) | Elong.$^b$ (%) | T.S.$^b$ (psi) | Flex. Mod.$^c$ (psi × $10^5$) | Heat$^c$ Deflection (°F) | Melt Index |
|---|---|---|---|---|---|---|---|---|---|
| 19 | 7.1  | 104  | 14.6 | —    | 19   | 3000 | 1.43 | 107 | 20.0 |
| 20 | 8.2  | 115  | 14.0 | 3600 | 280  | 2300 | 1.34 | 106 | 3.5  |
| 21 | 10.4 | 146  | 14.0 | 3300 | 460  | 2300 | 1.22 | 109 | 1.5  |
| 22 | 31.0 | 331  | 10.8 | 3400 | 715  | 3500 | 1.12 | —   | —    |
| 23 | 32.9 | 423  | 13.0 | 3500 | 630  | 4600 | 1.22 | 102 | —    |
| 24 | 95.0 | 1470 | 15.1 | 3500 | 930  | 5400 | 1.24 | 99  | —    |
| 25 | 24.5 | 131  | 5.3  | 3600 | 1340 | 5100 | —    | 103 | —    |
| 26 | 30.2 | 204  | 6.7  | 3400 | 820  | 5200 | 1.54 | 105 | —    |

All physical properties are on compression molded unannealed samples.
$^a$GPC computer analysis (P.D. = Polydispersity).
$^b$20 mil. sheets 2 inches/minute crosshead speed on Instron Tester.
$^c$⅛" × ½" × 5" bars; Heat Deflection at 264 psi fiber stress.

TABLE II

PROPERTIES OF GRAFT COPOLYMERS HAVING POLYETHYLENE BACKBONE AND POLYSTYRENE SIDECHAINS (BROAD MWD)

| Example | $\bar{M}n^a$ ×($10^3$) | $\bar{M}w^a$ ×($10^3$) | P.D.$^a$ | Macromolecular Mwt. ×($10^3$) | Monomer (%) | Yield$^b$ Str. (psi) | Elong.$^b$ (%) | T.S.$^b$ (psi) | Flex. Mod.$^c$ (psi × $10^5$) | Heat$^c$ Deflection (°F) |
|---|---|---|---|---|---|---|---|---|---|---|
| 27 | 16.1 | 232 | 14.4 | 15 | 2  | 3800 | 850 | 4300 | 1.60 | 102 |
| 28 | 37.4 | 603 | 16.1 | 15 | 5  | 3400 | 850 | 5900 | 1.56 | —   |
| 29 | 19.3 | 287 | 14.9 | 15 | 9  | 3600 | 880 | 5500 | 1.41 | 110 |
| 30 | 17.0 | 230 | 13.8 | 15 | 12 | 4000 | 920 | 5800 | —    | —   |
| 31 | 26.8 | 353 | 13.2 | 15 | 15 | 4200 | 720 | 5700 | 1.54 | 123 |
| 32 | 27.2 | 347 | 12.7 | 15 | 17 | 4300 | 650 | 4500 | 1.61 | 141 |
| 33 | 34.1 | 480 | 14.0 | 27 | 3  | 3500 | 790 | 7000 | 1.49 | 108 |
| 34 | 23.3 | 236 | 10.1 | 27 | 8  | 3500 | 650 | 6300 | 1.31 | 109 |

All physical properties are on compression molded unannealed samples.
$^a$GPC computer analysis (P.D. = Polydispersity).
$^b$20 mil. sheets 2 inches/minute crosshead speed on Instron Tester.
$^c$⅛" × ½" × 5" bars; Heat Deflection at 264 psi fiber stress.

TABLE III

PROPERTIES OF GRAFT COPOLYMERS HAVING POLYETHYLENE BACKBONE AND POLYSTYRENE SIDECHAINS (NARROW MWD)

| Example | $\bar{M}n^a$ ×($10^3$) | $\bar{M}w^a$ ×($10^3$) | P.D.$^a$ | Macromolecular Mwt. ×($10^3$) | Monomer (%) | Yield$^b$ Str. (psi) | Elong.$^b$ (%) | T.S.$^b$ (psi) | Flex. Mod.$^c$ (psi × $10^5$) | Heat$^c$ Deflection (°F) |
|---|---|---|---|---|---|---|---|---|---|---|
| 35 | 24.7  | 227.0  | 9.2 | 15 | 5  | 3400 | 800  | 5800 | 1.45        | 103       |
| 36 | 18.2  | 64.4   | 3.5 | 27 | 6  | 3300 | 400  | 6400 | 1.44        | 100       |
| 37 | 33.1  | 176.0  | 5.3 | 15 | 10 | 3400 | 1000 | 5700 | 1.52        | 109       |
| 38 | 116.0 | 494.0  | 4.3 | 24 | 15 | 3900 | 690  | 8000 | 1.45        | 115       |
| 39 | 7.3   | 42.0   | 5.1 | 15 | 20 | —    | 15   | 4500 | —           | —         |
| 40 | 33.5  | 135.0  | 4.0 | 27 | 20 | 4300 | 770  | 6000 | 1.61 (2.46)$^d$ | 127   |
| 41 | 195.0 | 1100.0 | 5.6 | 24 | 22 | 4000 | 370  | 4900 | 1.75 (2.11)$^d$ | 144 (151)$^d$ |
| 42 | 382.0 | 2420.0 | 6.3 | 24 | 20 | 4200 | 330  | 5300 | 1.55        | 117       |
| 43 | 203.0 | 869.0  | 4.0 | 24 | 20 | 3600 | 490  | 4300 | 1.51        | 116       |
| 44 | + Macromolecular Monomer | — | — | — | 30 | — | 11 | 4200 | 2.56 | 160 |

All physical properties are on compression molded unannealed samples.
$^a$GPC computer analysis (P.D. = Polydispersity).
$^b$20 mil sheets 2 inches/minute crosshead speed on Instron Tester.
$^c$⅛" × ½" × 5" bars; Heat Deflection at 264 psi fiber stress.
$^d$Annealed.

The data presented are on unannealed compression molded samples and therefore illustrate trends of physical properties. Optimization of physical properties desired requires the synthesis of a copolymer with a balance of molecular weight, MWD, macromolecular monomer content and macromolecular monomer molecular weight.

It can be seen from Table I that the physical properties of polyethylene homopolymers as a function of molecular weight and molecular weight distribution (MWD) follow the expected trends. Also, the yield strength does not vary significantly with either molecular weight or MWD. The elongation and tensile strength increase with increasing molecular weight, whereas the modulus, heat deflection and melt index decrease with increasing molecular weight. Examples 25 and 26 have a narrower MWD and show significant increases in elongation and tensile strength over equivalent weight average molecular weight polyethylenes of a broader MWD.

The summation of data for the graft copolymers are divided into two groups, those having a polydispersity (P.D.) less than 10 given in Table II and a P.D. greater than 10 given in Table III in order to establish a logical comparison of the properties as can be seen from the corresponding difference in properties with polyethylene homopolymers.

By comparing the various properties of the graft copolymers with the homopolymers of the same average molecular weight, it is clear that the incorporation of the macromolecular monomer in the backbone of hydrocarbon polymers, such as polyethylene, improves many of the properties of polymer significantly without a sacrifice of beneficial properties possessed by the homopolymer. Such an improvement in properties is not expected in view of the fact that the macromolecular monomer is actually copolymerized into the backbone of polyethylene and interrupts the polyethylene segments. Generally, such copolymerization with polyethylene results in a loss of beneficial properties.

It is also evident from the data shown that the use of very low molar percent concentrations of the macromolecular monomer does not alter the crystalline content of polyethylene. Thus, the spherulitic structure is greatly reduced in the graft copolymers but not affected by simple blends of polyethylene hompolymer with the macromolecular monomer. The evidence, therefore, indicates that the macromolecular monomer sidechain segments are in the rubbery amorphous regions of polyethylene. In other words, the crystalline portion of polyethylene is the matrix having a rubbery dispersed phase which, in turn, has a glassy dispersed phase. The high $T_g$ amorphous polystyrene macromolecular monomer apparently reinforces the low $T_g$ rubbery phase at low macromolecular monomer contents in a similar way that the polystyrene domains behave in block polymers such as Kraton.

As the content of the macromolecular monomer is increased, the nature of the matrix and dispersed phase of the amorphous areas of the polyethylene will change until an inversion of phases takes place. Now the crystal matrix of polyethylene will have a plastic amorphous dispersed phase which, in turn, will have a rubbery dispersed phase to the extent that the chain configurations of the amorphous and crystalline portions of polyethylene will permit.

The ratios of the property values set forth in Tables I – III for polyethylene homopolymers and graft copolymers (polyethylene backbone and polystyrene sidechains having a uniform molecular weight of 15,400) are shown in FIGS. XII and XIII as normalized values vs. the macromolecular monomer content. These graphs show a definite effect of the macromolecular monomer in increasing all of the physical properties studied over those of polyethylene homopolymers of the same molecular weight and molecular weight distribution. As it can be seen in the graph (FIG. XII) the yield strength shows a sharp increase in the range of 4–12 percent by weight macromolecular monomer content, then a gradual increase with higher macromolecular content. The elongation and tensile strengths go through a maximum at about 12 percent macromolecular monomer. The flexural modulus has a sharp increase up to 4 percent incorporation of sidechain polymer, then plateaus to about 14–16 percent macromolecular monomer and again rises but less sharply at higher concentrations of the macromolecular monomer. The heat deflection shows a steady gain with increasing macromolecular content from 5 percent incorporation.

The above data and illustrations demonstrate some of the advantageous results obtained from graft copolymers having polyethylene backbones and polystyrene sidechains integrally copolymerized into the polyethylene backbone. Similar beneficial results are obtainable using polymerizable hydrocarbon monomers other than ethylene which produce polymers having a high Tm and a low Tg, e.g., lower alphaolefins such as propylene, butene-1, pentene-1, etc.

As it is illustrated in Example 15, sidechain polymers having a high Tg, such as polystyrene can be replaced with low Tg polymers such as polybutadiene and predominantly cis-polyisoprene. For example, isoprene can be anionically polymerized with secondary butyl lithium, preferably to a molecular weight of about 15,000 and terminated with allyl chloride. Alternatively, the rubbery living polymer can be "capped" with an alkylene oxide such as ethylene oxide followed by termination with allyl chloride, methallyl chloride, or methacrylyl chloride to obtain low Tg macromolecular monomers. The alpha-olefin terminated (allyl chloride and anionically polymerized isoprene) can be used to prepare super impact polyethylene or polypropylene copolymers utilizing known polymerization techniques. For example, the alpha-olefin terminated polyisoprene referred to above can be copolymerized with ethylene using a Ziegler type catalyst system or with propylene using a Natta type catalyst system.

Still another alternative illustrated in the examples includes the use of hydrocarbon monomers which produce rubbery polymers in the backbone of the copolymer. Included among these monomers are isobutylene, butadiene, isoprene, ethylene-propylene comonomers, etc. The physical properties of the rubbery backbone polymers are enhanced by copolymerization or incorporation into the backbone polymer a wide variety of macromolecular monomers, such as linear polymers anionically polymerized from styrene, alphamethylstyrene, ethylene oxide, 4-vinyl pyridine, methacrylonitrile, N,N-dimethylacrylamide, methyl methacrylate, etc. A preferred example being the macromolecular monomer of Example 18 (a) wherein the polystyrene capped with butadiene or isoprene is terminated with either allyl chloride or 2-bromomethyl-5-norbornene. The latter end group is particularly useful in preparing an ethylene-propylene backbone graft copolymer following the procedure of Examples 11 and 12.

As it can be seen from the above, the present invention provides a convenient and economical means for preparing copolymers utilizing a large variety of hydrocarbon monomers in forming the backbone polymeric blocks and a wide variety of anionically polymerizable monomers in forming the sidechain polymers. The copolymerization is facilitated by a judicious selection of the terminal end group on the anionically polymerized polymer. Thus, the problem of copolymerizing incompatible polymers is solved providing an economical means for preparing copolymers having a backbone and sidechain polymer designed to fit one's needs and the particular end product desired.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. A chemically joined, phase separated thermoplastic graft copolymer of:
   a. a polymerizable macromolecular monomer having a substantially uniform molecular weight distribution, and
   b. a copolymerizable hydrocarbon monomer, said copolymerizable hydrocarbon monomer forming the polymeric backbone of said graft copolymer and said polymerizable macromolecular monomer forming linear polymeric sidechains of said graft copolymer, wherein:
      1. the polymeric backbone of the graft copolymer is comprised of polymerized units of said copolymerizable hydrocarbon monomer, at least one of said copolymerizable hydrocarbon monomers being a member selected from the group consisting of:
         i. ethylene and
         ii. a comonomeric mixture of ethylene and propylene;
      2. the linear polymeric sidechains of the graft copolymer consist essentially of a polymerized macromolecular monomer, said macromolecular monomer comprising a linear polymer or copolymer having a molecular weight in the range of from about 5,000 to about 50,000 and having a substantially uniform molecular weight distribution, such that its ratio of $\overline{M}w/\overline{M}n$ is less than about 1.1, said macromolecular monomer being further characterized as having no more than one polymerizable moiety per linear polymer or copolymer chain, said polymerizable moiety being on the end of the chain, said copolymerization occurring between the polymerizable end group of said macromolecular monomer and said copolymerizable hydrocarbon monomer; and
      3. the linear polymeric sidechains of the graft copolymer are copolymerized into the copolymeric backbone and are separated by at least about 20 uninterrupted recurring monomeric units of said backbone polymer, the distribution of the sidechains along the backbone and the copolymerization being controlled by the reactivity ratios of the polymerizable end group on said macromolecular monomer and said copolymerizable comonomer.

2. The graft copolymer of claim 1, wherein said copolymerizable hydrocarbon monomer is ethylene.

3. The graft copolymer of claim 1, wherein said copolymerizable hydrocarbon monomer is a comonomeric mixture of ethylene and propylene.

4. The graft copolymer of claim 1, wherein up to 40 percent by weight of said polymerizable macromolecular monomer is copolymerized with said copolymerizable hydrocarbon monomer.

5. The graft copolymer of claim 1, wherein from about 5 percent to about 20 percent by weight of said polymerizable macromolecular monomer is copolymerized with said copolymerizable hydrocarbon monomer.

6. The graft copolymer of claim 1, wherein said polymerizable macromolecular monomer which is copolymerized with said copolymerizable hydrocarbon monomer is derived from a monofunctional polymerizable macromolecular monomer represented by the formula:

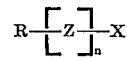

wherein R is lower alkyl, Z is a repeating monomeric unit of a member selected from the group consisting of styrene, alpha(methylstyrene), isoprene, butadiene and mixtures thereof, n is a positive integer such that the molecular weight of the polymer is in the range of from about 5,000 to about 50,000, and x is a polymerizable end group selected from the group consisting of:

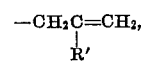

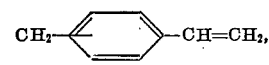

—CH₂CH₂OCH₂CH=CH₂, wherein R' is either hydrogen or lower alkyl.

7. The graft copolymer of claim 1, wherein said macromolecular monomer is represented by the structural formula:

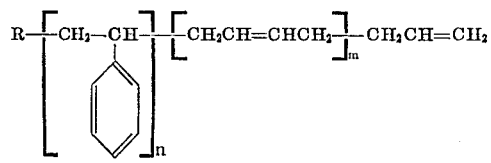

wherein R is lower alkyl, wherein *m* is a positive integer of about 1 or 2, and *n* is a positive integer of from about 50 to about 500.

8. The graft copolymer of claim 1, wherein said polymerizable macromolecular monomer is represented by the structural formula:

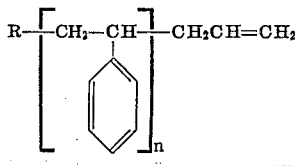

wherein R is lower alkyl and *n* is a positive integer having a value of from about 50 to about 500.

9. The graft copolymer of claim 8, wherein the copolymerizable hydrocarbon monomer is a member selected from the group consisting of ethylene of ethylene and propylene and comonomeric mixtures thereof.

10. A chemically joined, phase separated thermoplastic graft copolymer of:

a. a polymerizable macromolecular monomer having a substantially uniform molecular weight distribution, and b. a copolymerizable hydrocarbon monomer, said copolymerizable hydrocarbon monomer forming the polymeric backbone of said graft copolymer and said polymerizable macromolecular monomer forming linear polymeric sidechains of said graft copolymer, wherein:

1. the polymeric backbone of the graft copolymer is comprised of polymerized units of said copolymerizable hydrocarbon monomer, said copolymerizable hydrocarbon monomer is comprised of ethylene;

2. the linear polymeric sidechains of said graft copolymer consist essentially of a polymerized macromolecular monomer, said macromolecular monomer comprising a linear polymer represented by the structural formula:

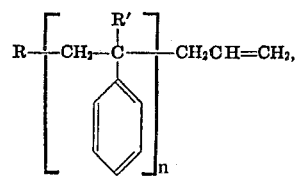

wherein R is lower alkyl, R' is either hydrogen or methyl, and *n* is a positive integer such that the molecular weight of the polymer is in the range of from about 5,000 to about 50,000, said macromolecular monomer being further characterized as having a substantially uniform molecular weight distribution, such that its ratio of $\overline{M}w/\overline{M}n$ is less than about 1.1, said copolymerization occurring between the polymerizable end group of said macromolecular monomer and said copolymerizable hydrocarbon monomer; and 3. the linear polymeric sidechains of the graft copolymer which are copolymerized into the copolymeric backbone are separated by at least about 20 uninterrupted recurring monomeric units of said backbone polymer, the distribution of the sidechains along the backbone and the copolymerization being controlled by the reactivity ratios of the polymerizable end group on said macromolecular monomer and said copolymerizable hydrocarbon monomer.

11. The graft copolymer of claim 10, wherein said copolymer is comprised of a normally crystalline polymer of ethylene copolymerized with up to 40 percent by weight of said polymerizable macromolecular monomer, said graft copolymer being represented by the structural formula:

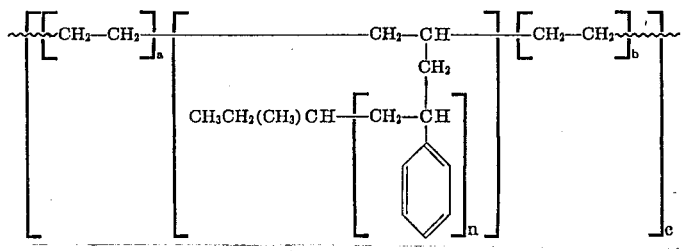

wherein the symbols *a*, *b*, *c* and *n* are each positive integers; and wherein *a* and *b* are at least about 20, and *n* has a value from about 50 to about 500.

12. The graft copolymer of claim 10, wherein from about 5 percent to about 20 percent by weight of said polymerizable macromolecular monomer is copolymerized with said copolymerizable hydrocarbon monomer.

13. A chemically joined, phase separated thermoplastic graft terpolymer of:

a. a polymerizable macromolecular monomer having a substantially uniform molecular weight distribution, and b. a copolymerizable hydrocarbon monomer, said copolymerizable hydrocarbon monomer forming the polymeric backbone of said graft terpolymer and said polymerizable macromolecular monomer forming linear polymeric sidechains of said graft terpolymer, wherein:

1. the polymeric backbone of the graft terpolymer is comprised of polymerized units of said copolymerizable hydrocarbon monomer, said copolymerizable hydrocarbon monomer is comprised of a comonomeric mixture of ethylene and propylene;

2. the linear polymeric sidechains of said graft terpolymer consist essentially of a polymerized macromolecular monomer, said macromolecular monomer comprising a linear polymer represented by the structural formula:

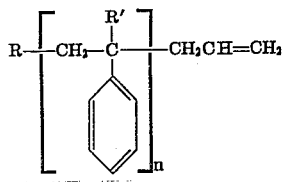

wherein R is lower alkyl, R' is either hydrogen or methyl, and n is a positive integer such that the molecular weight of the polymer is in the range of from about 5,000 to about 50,000, said macromolecular monomer being further characterized as having a substantially uniform molecular weight distribution, such that its ratio of $\overline{M}w/\overline{M}n$ is less than about 1.1, said copolymerization occurring between the polymerizable end group of said macromolecular monomer and said copolymerizable hydrocarbon monomer; and 3. the linear polymeric sidechains of the graft terpolymer which are terpolymerized into the terpolymeric backbone are separated by at least about 20 uninterrupted recurring monomeric units of said backbone polymer, the distribution of the sidechains along the backbone and the copolymerization being controlled by the reactivity ratios of the polymerizable end group on said macromolecular monomer and said copolymerizable hydrocarbon monomer.

14. The graft terpolymer of claim 13, wherein up to 40 percent by weight of said polymerizable macromolecular monomer is copolymerized with said copolymerizable hydrocarbon comonomeric mixture.

15. A chemically joined, phase separated thermoplastic graft terpolymer of:
   a. a polymerizable macromolecular monomer having a substantially uniform molecular weight distribution, and
   b. a copolymerizable hydrocarbon monomer, said copolymerizable hydrocarbon monomer forming the polymeric backbone of said graft terpolymer and said polymerizable macromolecular monomer forming linear polymeric sidechains of said graft terpolymer, wherein:
   1. the polymeric backbone of the graft terpolymer is comprised of polymerized units of said copolymerizable hydrocarbon monomer, said copolymerizable hydrocarbon monomer is comprised of a comonomeric mixture of ethylene and propylene;
   2. the linear polymeric sidechains of said graft copolymer consist essentially of a polymerized macromolecular monomer, said macromolecular monomer comprising a linear polymer represented by the structural formula:

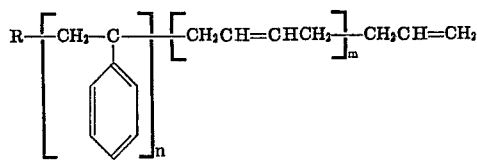

wherein R is lower alkyl, wherein m is a positive integer of about 1 or 2, and n is a positive integer of from about 50 to about 500, said macromolecular monomer being further characterized as having a substantially uniform molecular weight distribution, such that its ratio of $\overline{M}w/\overline{M}n$ is less than about 1.1, said copolymerization occurring between the polymerizable end group of said macromolecular monomer and said copolymerizable hydrocarbon monomer; and 3. the linear polymeric sidechains of the graft terpolymer which are terpolymerized into the terpolymeric backbone are separated by at least about 20 uninterrupted recurring monomeric units of said backbone polymer, the distribution of the sidechains along the backbone and the copolymerization being controlled by the reactivity ratios of the polymerizable end group on said macromolecular monomer and said copolymerizable hydrocarbon monomer.

16. The graft terpolymer of claim 15, wherein up to 40 percent by weight of said copolymerizable macromolecular monomer is terpolymerized with said copolymerizable comonomeric mixture.

17. A process for the preparation of a chemically joined, phase separated thermoplastic graft copolymer comprising:
   a. copolymerizing in the presence of a coordination catalyst in a hydrocarbon solvent a mixture of:
   1. up to about 40 percent by weight of a polymerizable macromolecular monomer comprising a linear polymer or copolymer having a molecular weight in the range of from about 5,000 to about 50,000 and having a substantially uniform molecular weight distribution such that its ratio of $\overline{M}w/\overline{M}n$ is less than about 1.1, said macromolecular monomer being further characterized as having no more than one polymerizable moiety per linear polymer or copolymer chain, said polymerizable moiety being on the end of the chain and being represented as having the formula $-CH=CH_2$; and
   2. at least one copolymerizable hydrocarbon monomer, said copolymerizable hydrocarbon monomers forming the polymeric backbone of said graft copolymer and said polymerizable macromolecular monomers forming the linear polymeric sidechains of said graft copolymer, and the linear polymeric sidechains of the graft copolymer are copolymerized into the backbone polymer through the polymerizable end group on said macromolecular monomer, and wherein said copolymerizable hydrocarbon monomers which form the copolymeric backbone are derived from a copolymerizable hydrocarbon monomer selected from the group consisting of ethylene, and comonomeric mixtures of ethylene and propylene, the linear polymeric or copolymeric sidechains of the graft copolyer which are copolymerized into the copolymeric backbone are separated by at least about 20 uninterrupted recurring monomeric units of said backbone polymer, the distribution and copolymerization of the sidechains along the backbone polymers being controlled by the relative reactivity ratios of the polymerizable end group on said macromolecular monomer and said copolymerizable hydrocarbon monomer; and
   b. recovering a chemically joined, phase separated thermoplastic graft copolymer obtained from said copolymerization.

18. The process of claim 17, wherein said polymerizable macromolecular monomer is represented by the structural formula:

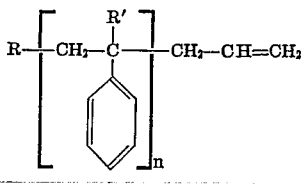

wherein R is lower alkyl and R' is either hydrogen or methyl and $n$ is a value such that the molecular weight of the polymer is in the range of from about 5,000 to about 50,000 and said catalyst is a Ziegler catalyst.

19. The process of claim 18, wherein said copolymerizable hydrocarbon monomer is ethylene.

20. The process of claim 18, wherein said copolymerizable hydrocarbon monomer is a comonomeric mixture of ethylene and propylene.

21. The process of claim 17, wherein said process is a batch process.

22. The process of claim 17, wherein said process is continuous.

* * * * *